(12) United States Patent
Shreve

(10) Patent No.: US 6,963,727 B2
(45) Date of Patent: *Nov. 8, 2005

(54) DIRECT-PATH-SIGNAL DETECTION APPARATUS AND ASSOCIATED METHODS

(75) Inventor: Gregory A. Shreve, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 694 days.

This patent is subject to a terminal disclaimer.

(21) Appl. No.: 09/915,620

(22) Filed: Jul. 26, 2001

(65) Prior Publication Data

US 2003/0022680 A1 Jan. 30, 2003

(51) Int. Cl.[7] .................... H04B 7/005; H04B 15/00; H04B 7/01
(52) U.S. Cl. ................. 455/39; 455/504; 455/506
(58) Field of Search .................... 455/65, 67.11, 455/504, 506, 67.13, 133, 225, 226.3, 275, 276.1, 303, 306; 342/139, 145; 375/340, 349

(56) References Cited

U.S. PATENT DOCUMENTS

| | | | |
|---|---|---|---|
| 4,559,606 A | 12/1985 | Jezo et al. | 364/728 |
| 4,672,638 A | 6/1987 | Taguchi et al. | 375/99 |
| 4,736,460 A | 4/1988 | Rilling | 455/283 |
| 4,752,969 A | 6/1988 | Rilling | 455/278 |
| 4,797,950 A | 1/1989 | Rilling | 455/276 |
| 5,239,309 A * | 8/1993 | Tang et al. | 342/13 |
| 5,402,450 A | 3/1995 | Lennen | 375/371 |
| 5,414,729 A | 5/1995 | Fenton | 375/209 |
| 5,445,029 A | 8/1995 | Falsetti et al. | 73/607 |
| 5,488,662 A | 1/1996 | Fox et al. | 342/189 |
| 5,534,876 A | 7/1996 | Erickson et al. | 342/387 |
| 5,644,597 A | 7/1997 | Ueda | 375/232 |
| 5,687,196 A | 11/1997 | Proctor, Jr. et al. | 375/347 |
| 5,815,539 A | 9/1998 | Lennen | 375/343 |
| 5,832,035 A | 11/1998 | Fullerton | 375/210 |
| 5,901,172 A | 5/1999 | Fontana et al. | 375/200 |
| 5,920,278 A | 7/1999 | Tyler et al. | 342/33 |
| 5,974,329 A * | 10/1999 | Wylie et al. | 455/456.1 |
| 6,005,510 A * | 12/1999 | Maurice et al. | 342/45 |
| 6,031,882 A * | 2/2000 | Enge et al. | 375/343 |
| 6,043,771 A | 3/2000 | Clark et al. | 342/13 |
| 6,122,224 A | 9/2000 | Higgins | |
| 6,232,922 B1 * | 5/2001 | McIntosh | 342/453 |
| 6,259,894 B1 * | 7/2001 | Tekinay | 455/65 |
| 6,313,620 B1 | 11/2001 | Richardson et al. | 324/76.31 |
| 6,486,831 B1 * | 11/2002 | Martorana et al. | 342/458 |
| 6,580,771 B2 * | 6/2003 | Kenney | 375/346 |
| 6,731,622 B1 * | 5/2004 | Frank et al. | 370/342 |

OTHER PUBLICATIONS

Joon–Yong Lee et al., "Time Of Arrival Estimation Of The Direct Path Signal In UWB Communications," Proceedings of International Union Of Radio Science, URSI 2000, 1 pg., Jan. 9, 2001.

(Continued)

Primary Examiner—Simon Nguyen
(74) Attorney, Agent, or Firm—O'Keefe, Egan & Peterman, LLP

(57) ABSTRACT

Direct-path-signal (DPS) detector circuitry includes a standard deviation calculator circuitry configured to determine a standard deviation of a plurality of data values within a data frame. The data frame corresponds to a radio-frequency signal received via a communication link. The DPS detector circuitry also includes a threshold circuitry configured to detect a direct-path signal depending on the relative values of the standard deviation and a threshold signal.

40 Claims, 34 Drawing Sheets

OTHER PUBLICATIONS

Joon–Yong Lee, "Ultra–Wideband Ranging In Dense Multipath Environments," Dissertation Presented To The Faculty Of The Graduate School University of Southern California, 115 pps., May 2002.

Joon–Yong Lee, "Time Of Arrival Estimation Of The Direct Path Signal In Ultrawideband Propagation," University of Southern California, 23 pps., Jan. 9, 2001.

Joon–Yong Lee, "UWB Ranging In Dense Multipath Environments," First Annual Review Of UWB MURI, 19 pps., May 23, 2002.

Co–Pending U.S. Appl. No. 09/915,891, entitled "First–Arriving–Pulse Detection Apparatus and Associated Methods" (TDCO:006).

Search Report, PCT/US02/23547, 5 pgs.

* cited by examiner

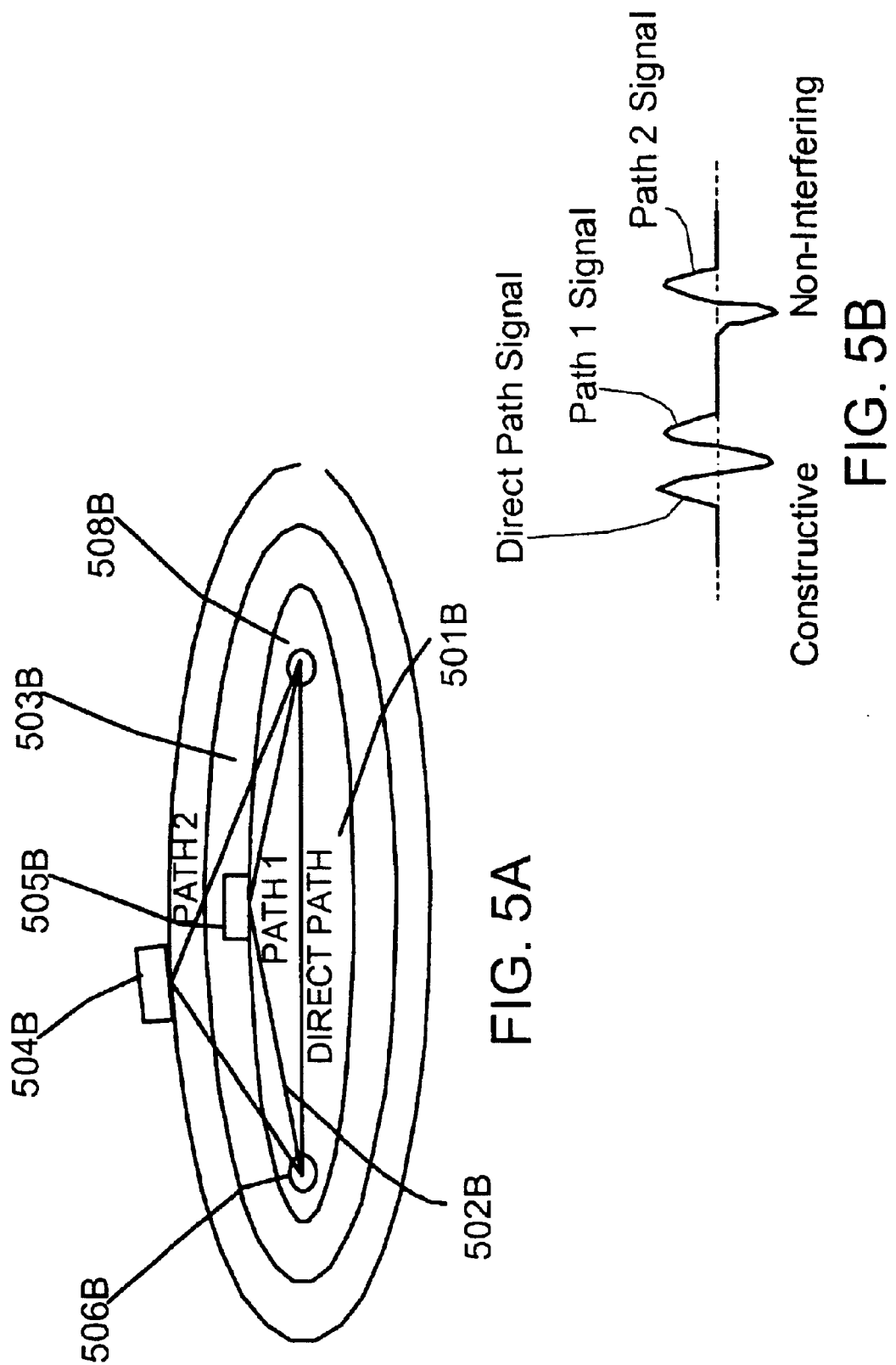

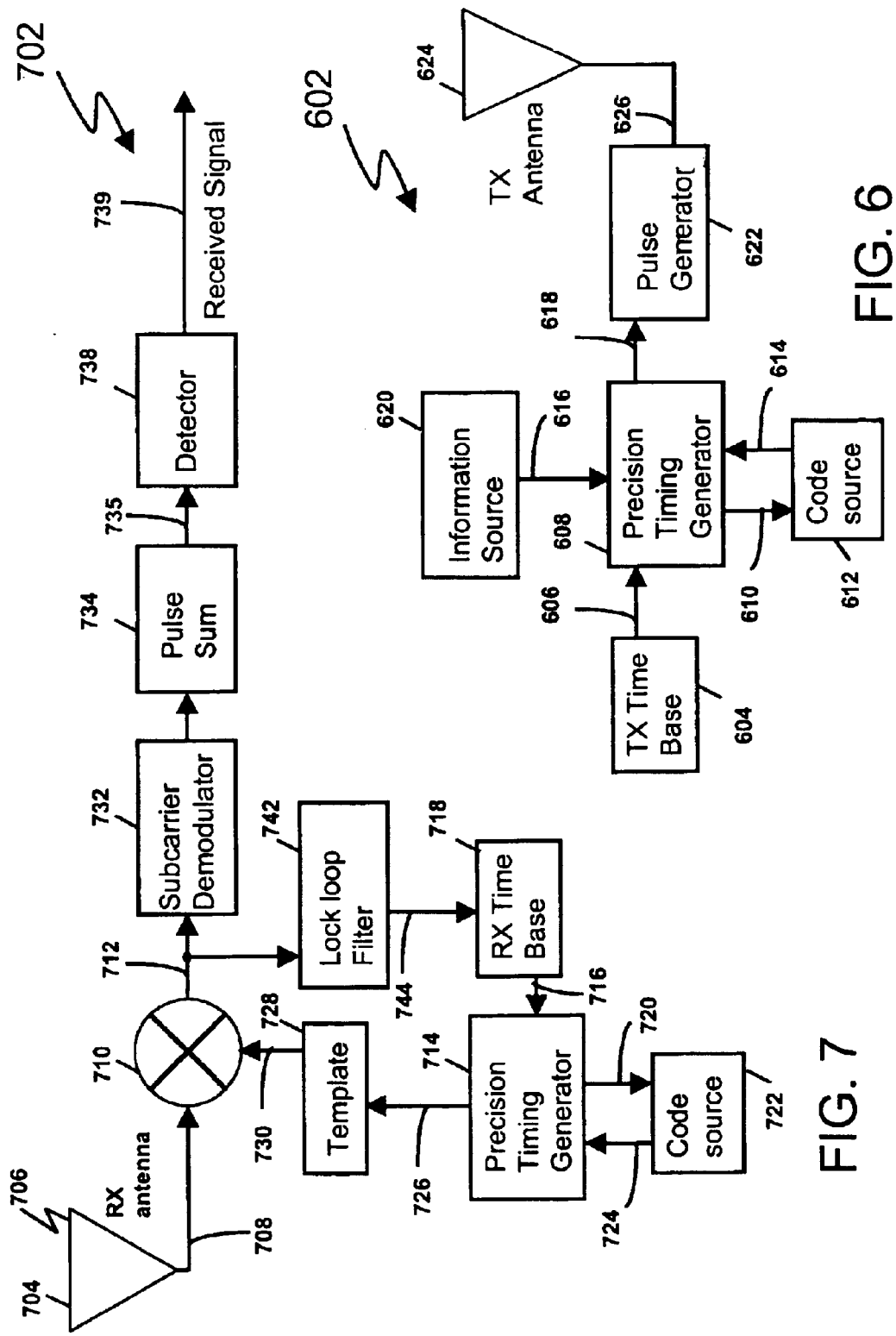

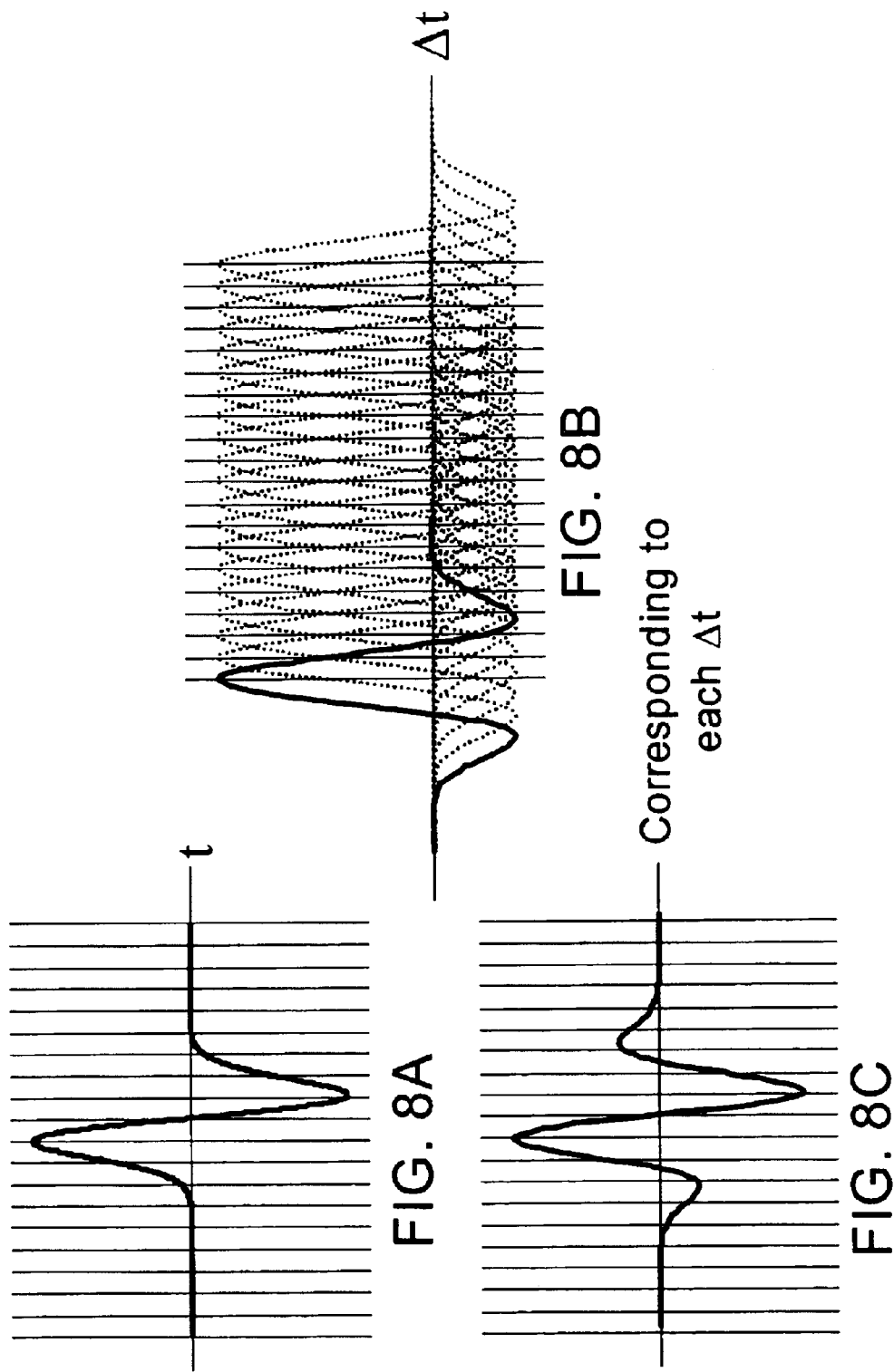

DIRECT-PATH-SIGNAL DETECTION APPARATUS AND ASSOCIATED METHODS

TECHNICAL FIELD OF THE INVENTION

This invention relates to communication, ranging, and positioning systems and, more particularly, to detecting direct-path signals in ultra-wideband communication, ranging, and positioning systems.

BACKGROUND

Modern communication and radar applications often involve positioning and ranging determinations. These applications typically seek to ascertain the range between two locations, for example between a radar station and a target, between two mobile stations, or between a base station and a mobile station. Other applications seek to determine the absolute or relative position of a target or a location.

Current positioning and ranging techniques suffer from a number of undesirable characteristics. For example, Global Positioning Satellite, or GPS, presently has a resolution limited to a few feet. Moreover, GPS systems rely on expensive, sophisticated satellites orbiting the earth. Thus, ranging and positioning applications that use GPS depend on the availability of the satellites and the signals that the satellites provide. In indoor areas, for example, GPS equipment typically cannot receive satellite signals and, thus, cannot provide reliable ranging and positioning information.

To overcome the shortcomings of GPS systems, other ranging and positioning systems use radar techniques. Radar systems usually transmit a signal that includes a plurality of pulses and, by timing the arrival of a signal reflected from a target, determine the range or position of a target. Those radar systems, like GPS systems, have a limited resolution. To provide improved resolution, some ranging and positioning systems use a single pulse. Proper and reliable operation of those systems, however, depends on their ability to distinguish the first pulse that may include information about the range, position, or both, of a target. Unfortunately, no known reliable techniques exist for detecting the direct-path signal and, thus, for determining the range, position, or both, of a target accurately and with improved resolution.

SUMMARY OF THE INVENTION

One aspect of the invention relates to direct-path-signal (DPS) detection apparatus. In one embodiment, a DPS detector circuitry includes a standard deviation calculator circuitry configured to determine a standard deviation of a plurality of data values within a data frame. The data frame corresponds to a radio-frequency signal received via a communication link. The DPS detector circuitry also includes a threshold circuitry configured to detect a direct-path signal depending on the relative values of the standard deviation and a threshold signal. More specifically, the received RF signal is received via a multipath propagation medium. The threshold circuitry includes a comparator circuitry configured to compare the determined standard deviation with the threshold signal to detect the direct-path signal.

A second embodiment according to the invention relates to a radio-frequency (RF) apparatus includes an RF receiver circuitry configured to receive via a communication link a plurality of pulses. The plurality of pulses result from a transmission of a radio-frequency pulse in a multipath propagation medium. The RF apparatus also includes a detector circuitry coupled to the radio-frequency receiver circuitry. The detector circuitry is configured to detect a direct-path pulse in the plurality of pulses. More specifically, the detector circuitry is further configured to detect the direct-path signal by using a standard deviation of a plurality of data values in a window within the data frame. The detector circuitry detects the direct-path signal depending on the relative values of the standard deviation of the plurality of data values and a threshold signal.

In another embodiment, a communication system includes a transmitter circuitry, a receiver circuitry, and a detector circuitry. The transmitter circuitry is configured to transmit a radio-frequency pulse into a multipath propagation medium. The receiver circuitry is configured to receive a plurality of pulses that result from the transmission of the radio-frequency pulse into the multipath propagation medium. The detector circuitry is configured to detect a direct-path pulse in the received plurality of pulses.

More specifically, the receiver circuitry receives the plurality of pulses via a communication link or channel. The detector circuitry detects the direct-path signal within a data frame that corresponds to the plurality of pulses. The detector circuitry uses a standard deviation of a plurality of data values in a window within the data frame. The detector circuitry detects the direct-path signal depending on the relative values of the standard deviation of the plurality of data values and a threshold signal.

Another aspect of the invention concerns methods for detecting direct-path signals. In one embodiment, a method according to the invention for detecting a direct-path signal includes determining a standard deviation of a plurality of data values within a data frame. The plurality of data values correspond to a radio-frequency signal received via a communication link. The method also includes detecting a direct-path signal depending on the relative values of the standard deviation and a threshold signal. More specifically, the received radio-frequency signal is received via a multipath propagation medium, and the plurality of data values reside in a window within the data frame. The method compares the determined standard deviation with the threshold signal to detect the direct-path signal.

In another embodiment, a method of detecting a direct-path pulse in a radio-frequency (RF) apparatus includes receiving via a communication link a plurality of pulses. The plurality of pulses result from a transmission of a radio-frequency pulse in a multipath propagation medium. The method further includes detecting a direct-path pulse in the plurality of pulses by using a detector circuitry in the radio frequency apparatus.

More specifically, the method further includes detecting the direct-path signal within a data frame that corresponds to the plurality of pulses. The method uses a standard deviation of a plurality of data values in a window within the data frame to detect the direct-path signal. The method detects the direct-path signal depending on the relative values of the standard deviation of the plurality of data values and a threshold signal.

DESCRIPTION OF THE DRAWINGS

The appended drawings illustrate only exemplary embodiments of the invention and therefore do not limit its scope, because the inventive concepts lend themselves to other equally effective embodiments. Like numerals in the drawings refer to the same, similar, or equivalent components, functions, systems, elements, or apparatus.

FIG. 5A illustrates a typical geometrical configuration giving rise to multipath received signals.

FIG. 5B illustrates exemplary multipath signals in the time domain.

FIG. 6 illustrates a representative impulse radio transmitter functional diagram.

FIG. 7 illustrates a representative impulse radio receiver functional diagram.

FIG. 8A illustrates a representative received pulse signal at the input to the correlator.

FIG. 8B illustrates a sequence of representative impulse signals in the correlation process.

FIG. 8C illustrates the output of the correlator for each of the time offsets of FIG. 8B.

DETAILED DESCRIPTION OF THE INVENTION

Figures 1A, 1B:
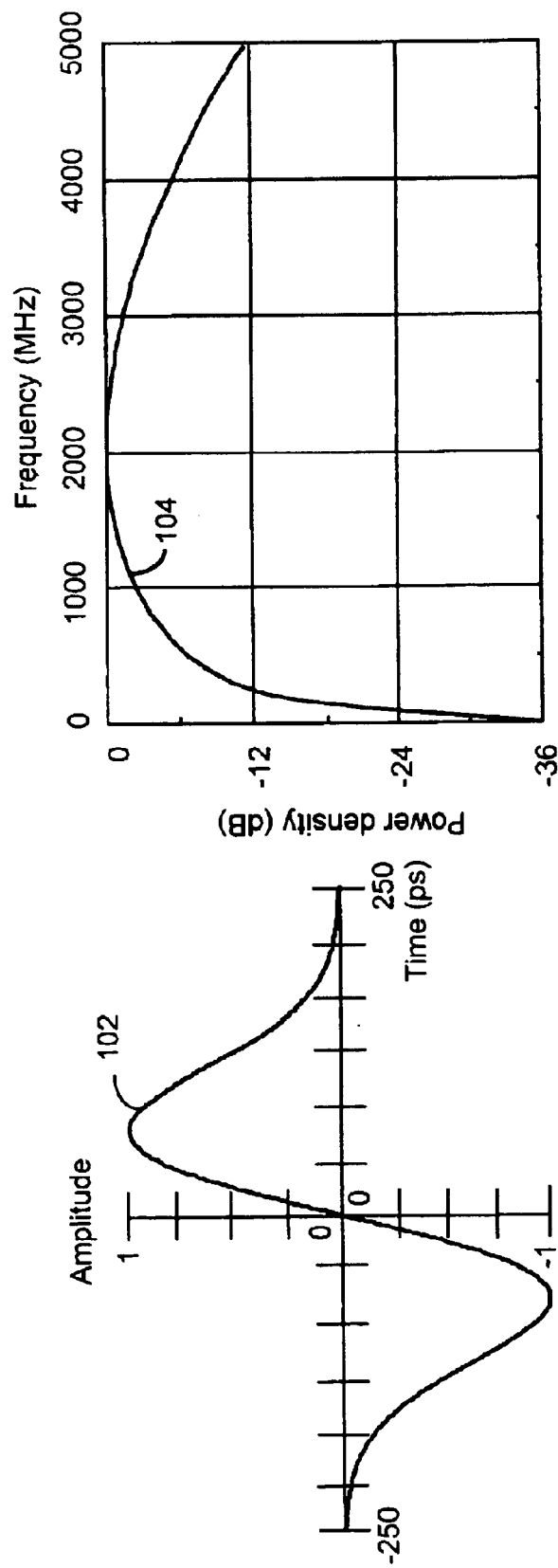
FIG. 1A illustrates a representative Gaussian Monocycle waveform in the time domain.
FIG. 1B illustrates the frequency domain amplitude of the Gaussian Monocycle of FIG. 1A.

Recent advances in communications technology have enabled an emerging, revolutionary ultra wideband technology (UWB) called impulse radio communications systems (hereinafter called impulse radio). To better understand the benefits of impulse radio to the present invention, the following review of impulse radio follows. Impulse radio was first fully described in a series of patents, including U.S. Pat. No. 4,641,317 (issued Feb. 3, 1987), U.S. Pat. No. 4,813,057 (issued Mar. 14, 1989), 4,979,186 (issued Dec. 18, 1990) and U.S. Pat. No. 5,363,108 (issued Nov. 8, 1994) to Larry W. Fullerton. A second generation of impulse radio patents includes U.S. Pat. No. 5,677,927 (issued Oct. 14, 1997), U.S. Pat. No. 5,687,169 (issued Nov. 11, 1997) and co-pending application Ser. No. 08/761,602 (filed Dec. 6, 1996) to Fullerton et al.

Uses of impulse radio systems are described in U.S. patent application Ser. No. 09/332,502, entitled, "System and Method for Intrusion Detection using a Time Domain Radar Array" and U.S. patent application Ser. No. 09/332,503, entitled, "Wide Area Time Domain Radar Array" both filed on Jun. 14, 1999 and both of which are assigned to the assignee of the present invention. The present patent application incorporates by reference the above patent documents.

Impulse Radio Basics

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example. However, someone skilled in the art will recognize that alternative modulation approaches may be used in replace of or in combination with time shift modulation approach without departing from the scope of the invention. In particular, amplitude modulation, especially antipodal amplitude modulation is useful and convenient in implementing instances of the invention.

In impulse radio communications, the pulse-to-pulse interval can be varied on a pulse-by-pulse basis by two components: an information component and a code component. Generally, conventional spread spectrum systems employ codes to spread the normally narrow band information signal over a relatively wide band of frequencies. A conventional spread spectrum receiver correlates these signals to retrieve the original information signal. Unlike conventional spread spectrum systems, in impulse radio communications codes are not needed for energy spreading because the monocycle pulses themselves have an inherently wide bandwidth. Instead, codes are used for channelization, energy smoothing in the frequency domain, resistance to interference, and reducing the interference potential to nearby receivers.

The impulse radio receiver is typically a direct conversion receiver with a cross correlator front end which coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. In impulse radio communications utilizing antipodal amplitude modulation, an information component comprising one or more bits of data typically amplitude modulates a sequence of pulses comprising a periodic timing signal with a plus one or minus one to represent binary data. This yields a modulated, coded timing signal that comprises a train of pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,
$\sigma$ is a time scaling parameter,
t is time,
$f_{mono}(t)$ is the waveform voltage, and
e is the natural logarithm base.

The frequency domain spectrum of the above waveform is shown in FIG. 1B. The corresponding equation is:

$$F_{mono}(f) = (2\pi)^{\frac{3}{2}}\sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2B:
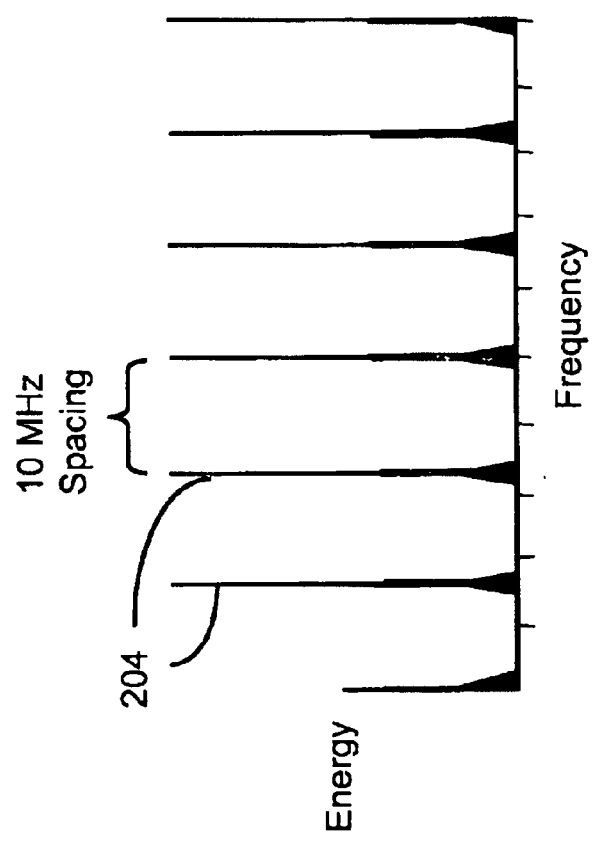
FIG. 2B illustrates the frequency domain amplitude of the waveform of FIG. 2A.
Figure 2A:
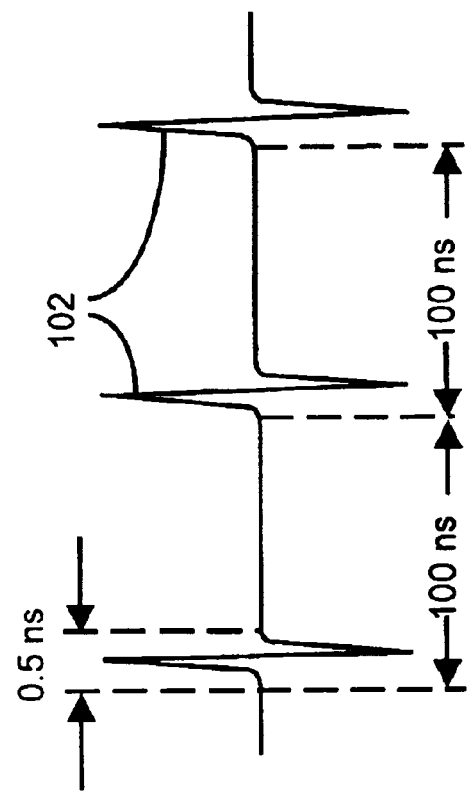
FIG. 2A illustrates a pulse train comprising pulses as in FIG. 1A.

Prototypes have been built which have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHZ at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to a receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by non-uniformly positioning each pulse relative to its nominal position according to a code such as a pseudo random code.

Figure 3:
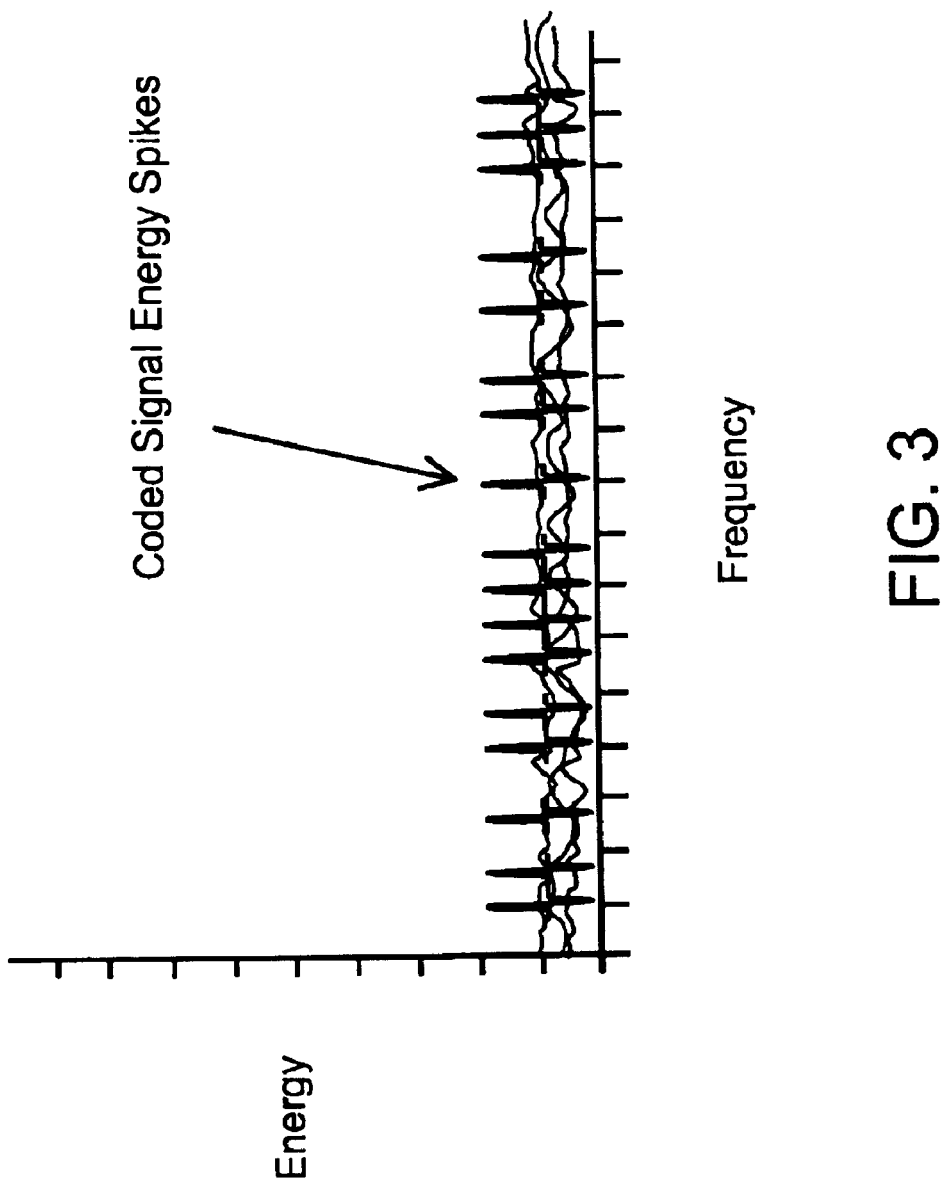
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining pseudo-random positioning for each pulse in a sequence of pulses). FIG. 3, when compared to FIG. 2B, shows that the impact of using a PN code is to destroy the comb line structure and spread the energy more uniformly. This structure typically has slight variations that are characteristic of the specific code used.

Coding also provides a method of establishing independent communication channels using impulse radio. Codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to code dither) in response to the information signal. This amount is typically very small relative to the code shift. In a 10 Mpps system with a center frequency of 2 GHz., for example, the code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smoothes the spectrum, minimizing structure in the resulting spectrum.

Reception and Demodulation

Clearly, if there were a large number of impulse radio users within a confined area, there might be mutual interference. Further, while coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The code helps impulse systems discriminate between the intended impulse transmission and interfering transmissions from others.

Figure 4:
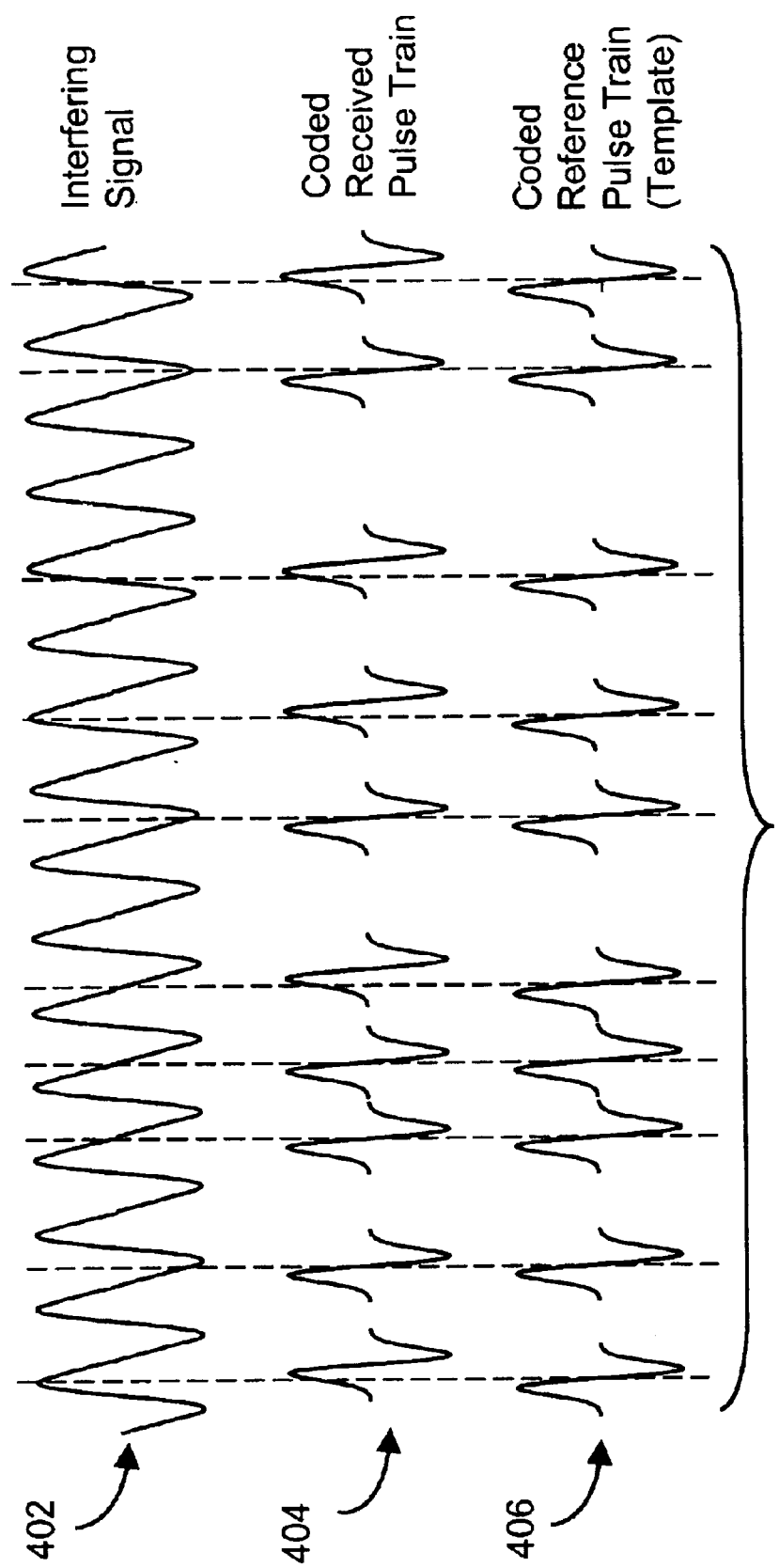
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultra-wideband impulse radio signal 404. The input is sampled by the cross correlator with a code dithered template signal 406. Without coding, the cross correlation would sample the interfering signal 402 with such regularity that the interfering signals could cause significant interference to the impulse radio receiver. However, when the transmitted impulse signal is encoded with the code dither (and the impulse radio receiver template signal 406 is synchronized with that identical code dither) the correlation samples the interfering signals non-uniformly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 KHz information bandwidth and a 10 MHz channel bandwidth yields a processing gain of 1000 or 30 dB. However, far greater processing gains are achieved by impulse radio systems, where the same 10 KHz information bandwidth is spread across a much greater 2 GHz channel bandwidth, resulting in a theoretical processing gain of 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight-line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.75 cm at 2 GHz center frequency) are the only multipath signals that can attenuate the direct path signal. This region is equivalent to the first Fresnel zone familiar to narrow band systems designers. Impulse radio, however, has no further nulls in the higher order Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal that propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

Figure 5C:
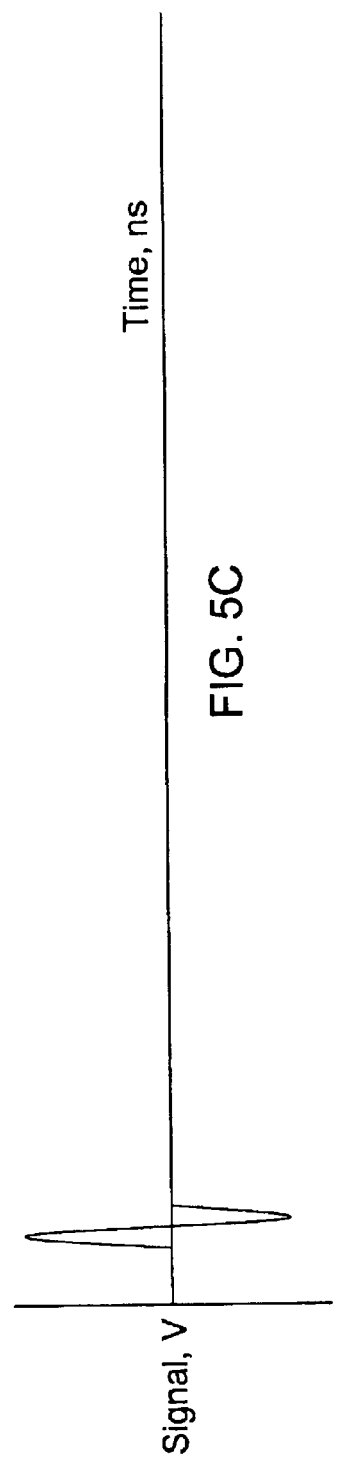
FIGS. 5C–5E illustrate a signal plot of various multipath environments.
Figure 5D:
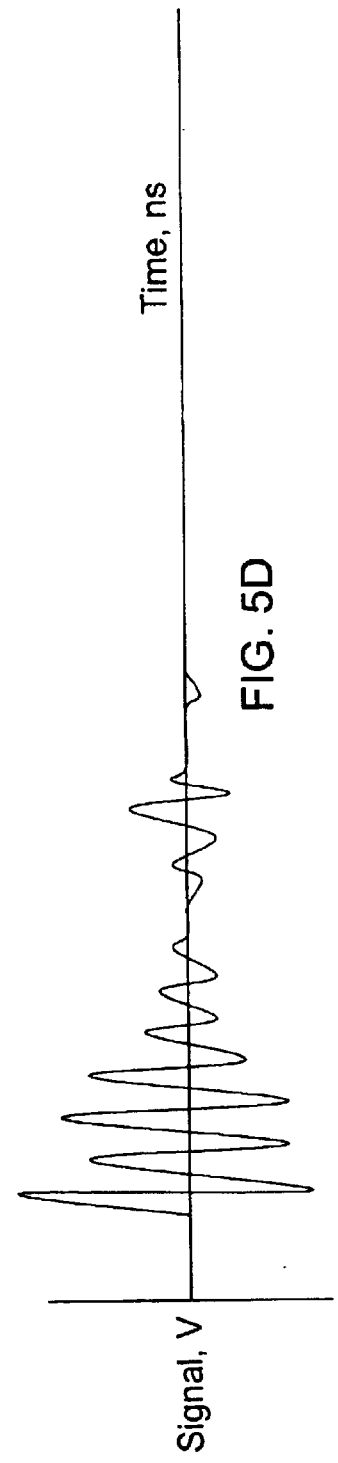
Figure 5E:
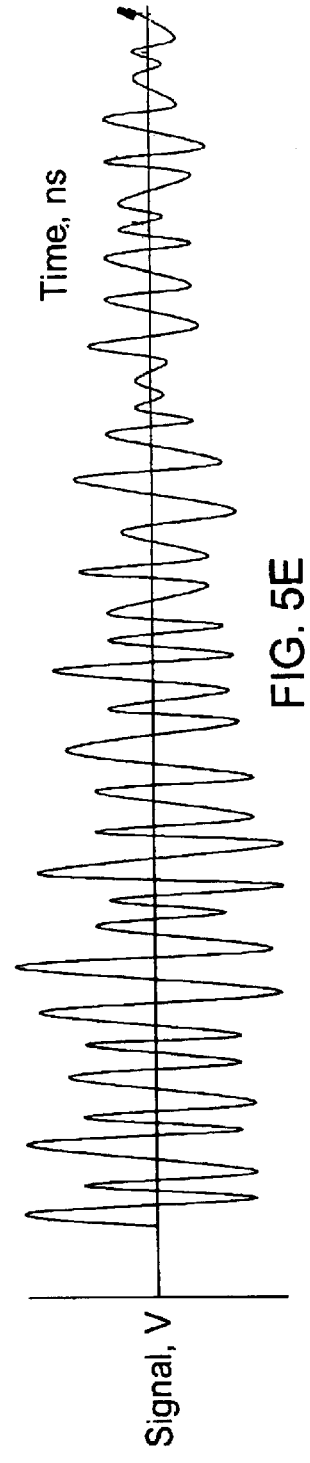
Figure 5F:
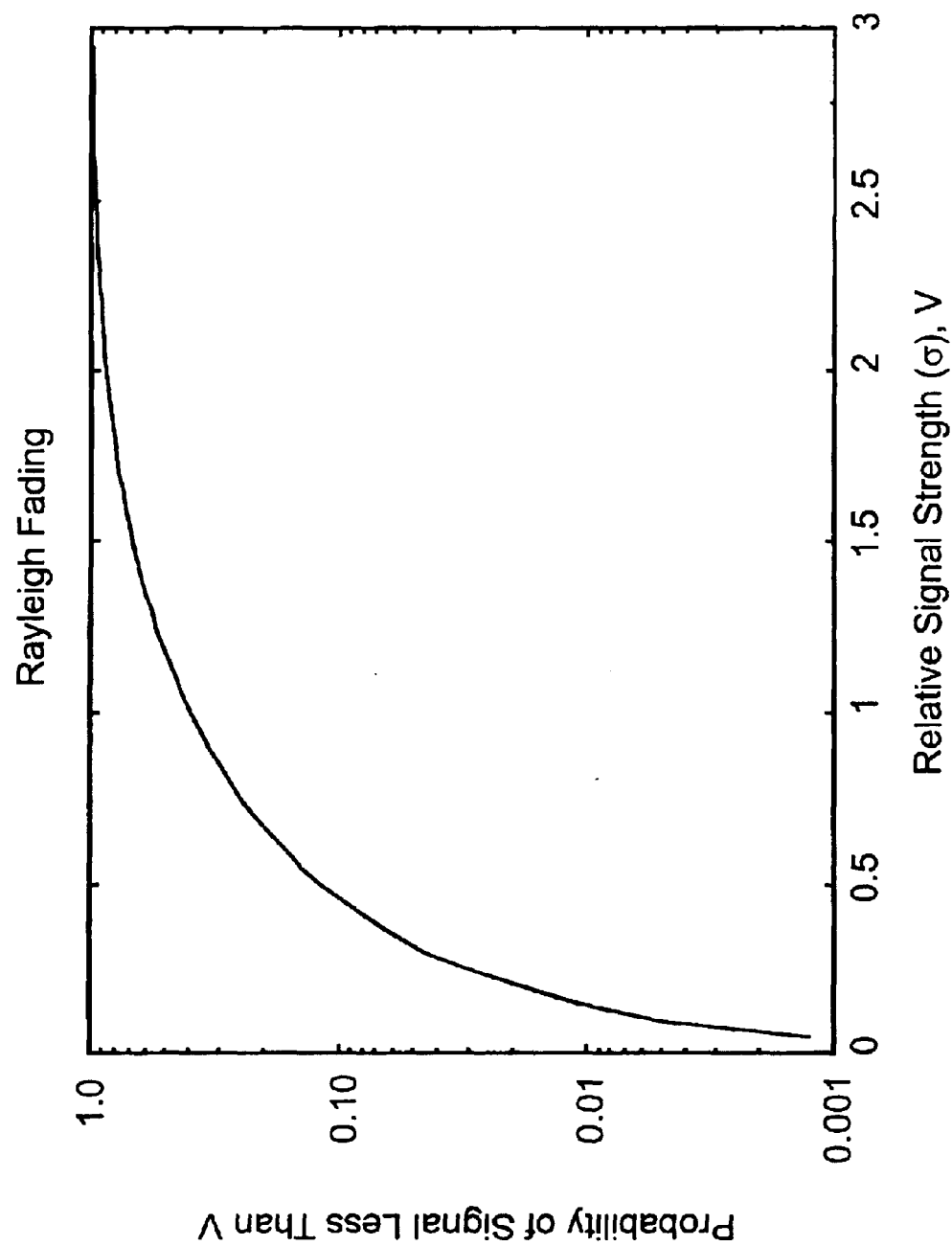
FIG. 5F illustrates the Rayleigh fading curve associated with non-impulse radio transmissions in a multipath environment.

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. In this situation, the direct path signal power is small relative to the total signal power from the reflections.

An impulse radio receiver can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be cancelled simultaneously and precisely while blocking the direct path—a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5B is a narrow band system and the delays are small relative to the data bit time, the received signal is a sum of a large number of sine waves of random amplitude and phase. In the idealized limit, the resulting envelope amplitude has been shown to follow a Rayleigh cumulative probability distribution as follows:

$$p(S_{dB})=1-\exp(-10^{S_{dB}/10})$$

where $S_{dB}$ is the instantaneous signal level expressed in as a decibel ratio to the average multipath power, and $p(S_{dB})$ is the probability that the signal less than $S_{dB}$. From the equation: $p(-10 \text{ dB})=0.1$ hence, 10% of the time the signal is 10 or more dB below the average multipath power.

Figures 5G, 5H:
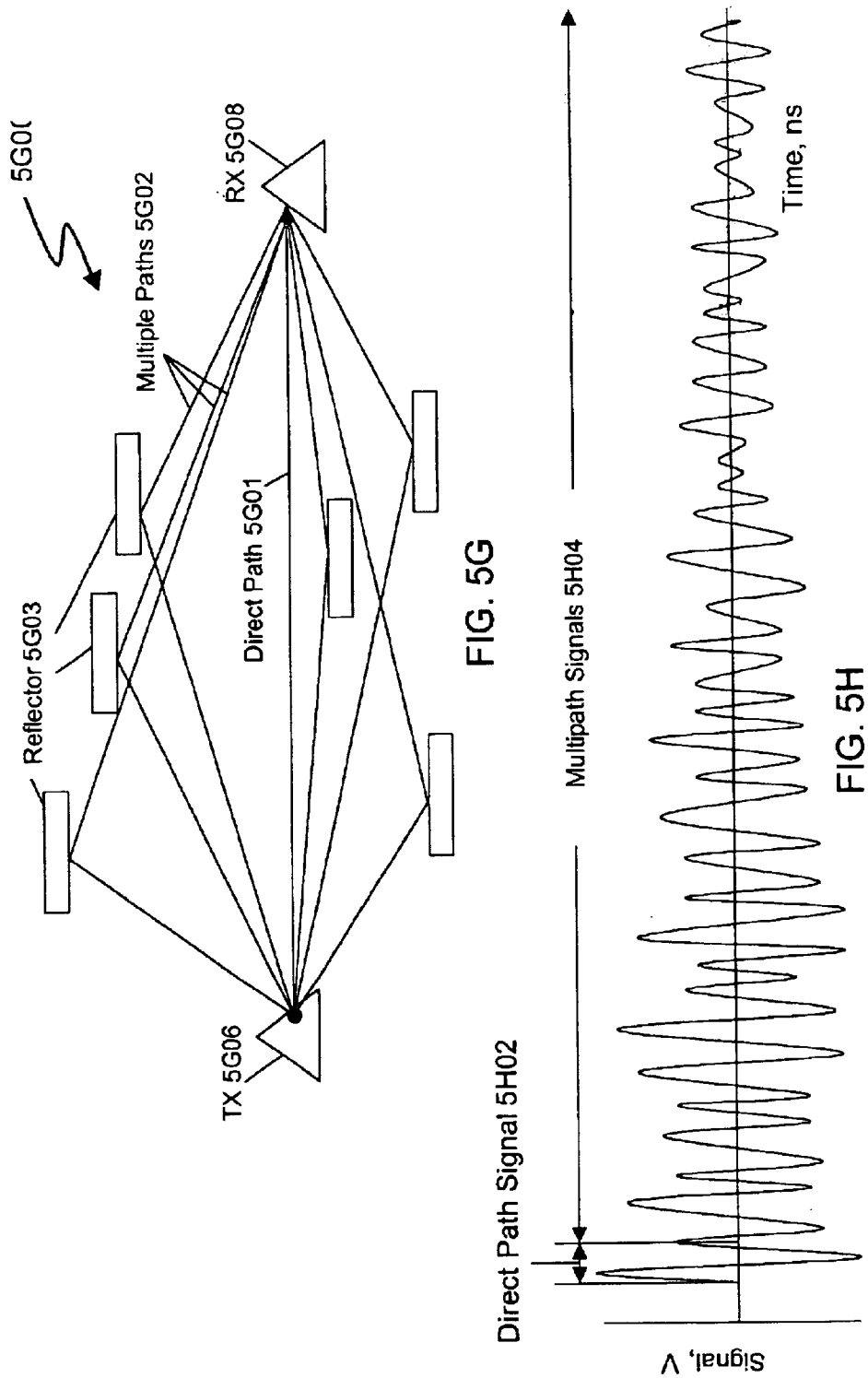
FIG. 5G illustrates a plurality of multipaths with a plurality of reflectors from a transmitter to a receiver.
FIG. 5H graphically represents signal strength as volts vs. time in a direct path and multipath environment.

This distribution is shown in FIG. 5G. It can be seen in FIG. 5G that approximately 10% of the time, the signal is more than 10 dB below the average multipath power. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIGS. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02, with the vertical axis being the signal strength in volts and horizontal axis representing time in nanoseconds. Multipath signals are graphically illustrated at 5H04.

Distance Measurement

Important for positioning, impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending applications Ser. No. 09/045,929, filed Mar. 23, 1998, titled "Ultrawide-Band Position Determination System and Method", and Ser. No. 09/083,993, filed May 26, 1998, titled "System and Method for Distance Measurement by Inphase and Quadrature Signals in a Radio System," both of which are incorporated herein by reference.

In addition to the methods articulated above, impulse radio technology along with Time Division Multiple Access algorithms and Time Domain packet radios can achieve geo-positioning capabilities in a radio network. This geo-positioning method allows ranging to occur within a network of radios without the necessity of a full duplex exchange among every pair of radios.

Exemplary Transceiver Implementation

Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated sub carrier signal (which is optional) and an information signal 616 to generate a modulated, coded timing signal 618. The code source 612 comprises a storage device such as a random access memory (RAM), read only memory (ROM), or the like, for storing suitable codes and for outputting the PN codes as a code signal 614. Alternatively, maximum length shift registers or other computational means can be used to generate the codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultra-wideband, approaching a monocycle pulse as in FIG. 1A. However, the emitted signal can be spectrally modified by filtering of the pulses. This bandpass filtering will cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710 via a receiver transmission line, coupled to the receive antenna 704, and producing a baseband output 712.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 ideally comprises a multiplier followed by a short term integrator to sum the multiplier product over the pulse interval.

The output of the correlator 710 is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to determine an output signal 739 representing the digital state of the output voltage of sample and hold 736.

The baseband signal 712 is also input to a low-pass filter 742 (also referred to as lock loop filter 742). A control loop comprising the low-pass filter 742, time base 718, precision timing generator 714, template generator 728, and correlator 710 is used to generate an error signal 744. The error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph does not show a waveform that is a function of time, but rather a function of time-offset. For any given pulse received, there is only one corresponding point that is applicable on this graph. This is the point corresponding to the time offset of the template signal used to receive that pulse. Further examples and details of precision timing can be found described in U.S. Pat. No. 5,677,927, and commonly owned co-pending application Ser. No. 09/146, 524, filed Sep. 3, 1998, titled "Precision Timing Generator System and Method" both of which are incorporated herein by reference.

Recent Advances in Impulse Radio Communication Modulation Techniques

To improve the placement and modulation of pulses and to find new and improved ways that those pulses transmit information, various modulation techniques have been developed. The modulation techniques articulated above as well as the recent modulation techniques invented and summarized below are incorporated herein by reference.

FLIP Modulation

An impulse radio communications system can employ FLIP modulation techniques to transmit and receive flip modulated impulse radio signals. Further, it can transmit and receive flip with shift modulated (also referred to as quadrature flip time modulated (QFTM)) impulse radio signals. Thus, FLIP modulation techniques can be used to create two, four, or more different data states.

Flip modulators include an impulse radio receiver with a time base, a precision timing generator, a template generator, a delay, first and second correlators, a data detector and a time base adjustor. The time base produces a periodic timing signal that is used by the precision timing generator to produce a timing trigger signal. The template generator uses the timing trigger signal to produce a template signal. A delay receives the template signal and outputs a delayed template signal. When an impulse radio signal is received, the first correlator correlates the received impulse radio signal with the template signal to produce a first correlator output signal, and the second correlator correlates the received impulse radio signal with the delayed template signal to produce a second correlator output signal. The data detector produces a data signal based on at least the first correlator output signal. The time base adjustor produces a time base adjustment signal based on at least the second correlator output signal. The time base adjustment signal is used to synchronize the time base with the received impulse radio signal.

For greater elaboration of FLIP modulation techniques, the reader is directed to the patent application entitled, "Apparatus, System and Method for FLIP Modulation in an Impulse Radio Communication System", Ser. No. 09/537, 692, filed Mar. 29, 2000 and assigned to the assignee of the present invention. This patent application is incorporated herein by reference.

Vector Modulation

Vector Modulation is a modulation technique which includes the steps of generating and transmitting a series of time-modulated pulses, each pulse delayed by one of four pre-determined time delay periods and representative of at least two data bits of information, and receiving and demodulating the series of time-modulated pulses to estimate the data bits associated with each pulse. The apparatus includes an impulse radio transmitter and an impulse radio receiver.

The transmitter transmits the series of time-modulated pulses and includes a transmitter time base, a time delay modulator, a code time modulator, an output stage, and a transmitting antenna. The receiver receives and demodulates the series of time-modulated pulses using a receiver time base and two correlators, one correlator designed to operate after a pre-determined delay with respect to the other correlator. Each correlator includes an integrator and a comparator, and may also include an averaging circuit that calculates an average output for each correlator, as well as a track and hold circuit for holding the output of the integrators. The receiver further includes an adjustable time delay circuit that may be used to adjust the pre-determined delay between the correlators in order to improve detection of the series of time-modulated pulses.

For greater elaboration of Vector modulation techniques, the reader is directed to the patent application entitled, "Vector Modulation System and Method for Wideband Impulse Radio Communications", Ser. No. 09/169,765, filed Dec. 9, 1999 and assigned to the assignee of the present invention. This patent application is incorporated herein by reference.

Receivers

Because of the unique nature of impulse radio receivers several modifications have been recently made to enhance system capabilities.

Multiple Correlator Receivers

Multiple correlator receivers utilize multiple correlators that precisely measure the impulse response of a channel and wherein measurements can extend to the maximum communications range of a system, thus, not only capturing ultra-wideband propagation waveforms, but also information on data symbol statistics. Further, multiple correlators enable rake acquisition of pulses and thus faster acquisition, tracking implementations to maintain lock and enable various modulation schemes. Once a tracking correlator is synchronized and locked to an incoming signal, the scanning correlator can sample the received waveform at precise time delays relative to the tracking point. By successively increasing the time delay while sampling the waveform, a complete, time-calibrated picture of the waveform can be collected.

For greater elaboration of utilizing multiple correlator techniques, the reader is directed to the patent application entitled, "System and Method of using Multiple Correlator Receivers in an Impulse Radio System", Ser. No. 09/537,264, filed Mar. 29, 2000 and assigned to the assignee of the present invention. This patent application is incorporated herein by reference.

Fast Locking Mechanisms

Methods to improve the speed at which a receiver can acquire and lock onto an incoming impulse radio signal have been developed. In one approach, a receiver comprises an adjustable time base to output a sliding periodic timing signal having an adjustable repetition rate and a decode timing modulator to output a decode signal in response to the periodic timing signal. The impulse radio signal is cross-correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by one or more extra counts after each T pulses is reached in order to shift the code modulo for proper phase alignment of the periodic timing signal and the received impulse radio signal. This method is described in detail in U.S. Pat. No. 5,832,035 to Fullerton, incorporated herein by reference.

In another approach, a receiver obtains a template pulse train and a received impulse radio signal. The receiver compares the template pulse train and the received impulse radio signal to obtain a comparison result. The system performs a threshold check on the comparison result. If the comparison result passes the threshold check, the system locks on the received impulse radio signal. The system may also perform a quick check, a synchronization check, and/or a command check of the impulse radio signal. For greater elaboration of this approach, the reader is directed to the patent application entitled, "Method and System for Fast Acquisition of Ultra Wideband Signals", Ser. No. 09/538,292, filed Mar. 29, 2000 and assigned to the assignee of the present invention. This patent application is incorporated herein by reference.

Baseband Signal Converters

A receiver has been developed which includes a baseband signal converter device and combines multiple converter circuits and an RF amplifier in a single integrated circuit package. Each converter circuit includes an integrator circuit that integrates a portion of each RF pulse during a sampling period triggered by a timing pulse generator. The integrator capacitor is isolated by a pair of Schottky diodes connected to a pair of load resistors. A current equalizer circuit equalizes the current flowing through the load resistors when the integrator is not sampling. Current steering logic transfers load current between the diodes and a constant bias circuit depending on whether a sampling pulse is present.

For greater elaboration of utilizing baseband signal converters, the reader is directed to the patent application entitled, "Baseband Signal Converter for a Wideband Impulse Radio Receiver", Ser. No. 09/356,384, filed Jul. 16, 1999 and assigned to the assignee of the present invention. This patent application is incorporated herein by reference.

Power Control and Interference

Power Control

Power control improvements have been invented with respect to impulse radios. The power control systems comprise a first transceiver that transmits an impulse radio signal to a second transceiver. A power control update is calculated according to a performance measurement of the signal received at the second transceiver. The transmitter power of either transceiver, depending on the particular embodiment, is adjusted according to the power control update. Various performance measurements are employed according to the current invention to calculate a power control update, including bit error rate, signal-to-noise ratio, and received signal strength, used alone or in combination. Interference is thereby reduced, which is particularly important where multiple impulse radios are operating in close proximity and their transmissions interfere with one another. Reducing the transmitter power of each radio to a level that produces satisfactory reception increases the total number of radios that can operate in an area without saturation. Reducing transmitter power also increases transceiver efficiency.

For greater elaboration of utilizing baseband signal converters, the reader is directed to the patent application entitled, "System and Method for Impulse Radio Power Control", Ser. No. 09/332,501, filed Jun. 14, 1999 and assigned to the assignee of the present invention. This patent application is incorporated herein by reference.

Mitigating Effects of Interference

To assist in mitigating interference to impulse radio systems a methodology has been invented. The method comprises the steps of: (a) conveying the message in packets; (b) repeating conveyance of selected packets to make up a repeat package; and (c) conveying the repeat package a plurality of times at a repeat period greater than twice the occurrence period of the interference. The communication may convey a message from a proximate transmitter to a distal receiver, and receive a message by a proximate receiver from a distal transmitter. In such a system, the method comprises the steps of: (a) providing interference indications by the distal receiver to the proximate transmitter; (b) using the interference indications to determine predicted noise periods; and (c) operating the proximate transmitter to convey the message according to at least one of the following: (1) avoiding conveying the message during noise periods; (2) conveying the message at a higher power during noise periods; (3) increasing error detection coding in the message during noise periods; (4) re-transmitting the message following noise periods; (5) avoiding conveying the message when interference is greater than a first strength; (6) conveying the message at a higher power when the interference is greater than a second strength; (7) increasing error detection coding in the message when the interference is greater than a third strength; and (8) re-transmitting a portion of the message after interference has subsided to less than a predetermined strength.

For greater elaboration of mitigating interference to impulse radio systems, the reader is directed to the patent application entitled, "Method for Mitigating Effects of Interference in Impulse Radio Communication", Ser. No. 09/587,033, filed Jun. 2, 1999 and assigned to the assignee of the present invention. This patent application is incorporated herein by reference.

Moderating Interference while Controlling Equipment

Yet another improvement to impulse radio includes moderating interference with impulse radio wireless control of an appliance; the control is affected by a controller remote from the appliance transmitting impulse radio digital control signals to the appliance. The control signals have a transmission power and a data rate. The method comprises the steps of: (a) in no particular order: (1) establishing a maximum acceptable noise value for a parameter relating to interfering signals; (2) establishing a frequency range for measuring the interfering signals; (b) measuring the parameter for the interference signals within the frequency range; and (c) when the parameter exceeds the maximum acceptable noise value, effecting an alteration of transmission of the control signals.

For greater elaboration of moderating interference while effecting impulse radio wireless control of equipment, the reader is directed to the patent application entitled, "Method and Apparatus for Moderating Interference While Effecting Impulse Radio Wireless Control of Equipment", Ser. No. 09/586,163, filed Jun. 2, 1999 and assigned to the assignee of the present invention. This patent application is incorporated herein by reference.

Coding Advances

The improvements made in coding can directly improve the characteristics of impulse radio as used in the present invention. Specialized coding techniques may be employed to establish temporal and/or non-temporal pulse characteristics such that a pulse train will possess desirable properties. Coding methods for specifying temporal and non-temporal pulse characteristics are described in commonly owned, co-pending applications entitled "A Method and Apparatus for Positioning Pulses in Time", Ser. No. 09/592,249, and "A Method for Specifying Non-Temporal Pulse Characteristics", Ser. No. 09/592,250, both filed Jun. 12, 2000, and both of which are incorporated herein by reference. Essentially, a temporal or non-temporal pulse characteristic value layout is defined, an approach for mapping a code to the layout is specified, a code is generated using a numerical code generation technique, and the code is mapped to the defined layout per the specified mapping approach.

A temporal or non-temporal pulse characteristic value layout may be fixed or non-fixed and may involve value ranges, discrete values, or a combination of value ranges and discrete values. A value range layout specifies a range of values for a pulse characteristic that is divided into components that are each subdivided into subcomponents, which can be further subdivided, ad infinitum. In contrast, a discrete value layout involves uniformly or non-uniformly distributed discrete pulse characteristic values. A non-fixed layout (also referred to as a delta layout) involves delta values relative to some reference value such as the characteristic value of the preceding pulse. Fixed and non-fixed layouts, and approaches for mapping code element values to them, are described in co-owned, co-pending applications, entitled "Method for Specifying Pulse Characteristics using Codes", Ser. No. 09/592,290 and "A Method and Apparatus for Mapping Pulses to a Non-Fixed Layout", Ser. No. 09/591,691, both filed on Jun. 12, 2000 and both of which are incorporated herein by reference.

A fixed or non-fixed characteristic value layout may include one or more non-allowable regions within which a characteristic value of a pulse is not allowed. A method for specifying non-allowable regions to prevent code elements from mapping to non-allowed characteristic values is described in co-owned, co-pending application entitled "A Method for Specifying Non-Allowable Pulse Characteristics", Ser. No. 09/592,289, filed Jun. 12, 2000 and incorporated herein by reference. A related method that conditionally positions pulses depending on whether or not code elements map to non-allowable regions is described in co-owned, co-pending application, entitled "A Method and Apparatus for Positioning Pulses Using a Layout having Non-Allowable Regions", Ser. No. 09/592,248 and incorporated herein by reference.

Typically, a code consists of a number of code elements having integer or floating-point values. A code element value may specify a single pulse characteristic (e.g., pulse position in time) or may be subdivided into multiple components, each specifying a different pulse characteristic. For example, a code having seven code elements each subdivided into five components (c0–c4) could specify five different characteristics of seven pulses. A method for subdividing code elements into components is described in commonly owned, co-pending application entitled "Method for Specifying Pulse Characteristics using Codes", Ser. No. 09/592,290, filed Jun. 12, 2000 previously referenced and again incorporated herein by reference. Essentially, the value of each code element or code element component (if subdivided) maps to a value range or discrete value within the defined characteristic value layout. If a value range layout is used an offset value is typically employed to specify an exact value within the value range mapped to by the code element or code element component.

The signal of a coded pulse train can be generally expressed:

$$s_{tr}^{(k)}(t) = \sum_j (-1)^{f_j^{(k)}} a_j^{(k)} \omega(c_j^{(k)} t - T_j^{(k)}, b_j^{(k)})$$

where k is the index of a transmitter, j is the index of a pulse within its pulse train, $(-1)f_j^{(k)}$, $a_j^{(k)}$, $c_j^{(k)}$, and $b_j^{(k)}$ are the coded polarity, amplitude, width, and waveform of the jth pulse of the kth transmitter, and $T_j^{(k)}$ is the coded time shift of the jth pulse of the kth transmitter. Note: When a given non-temporal characteristic does not vary (i.e., remains constant for all pulses in the pulse train), the corresponding code element component is removed from the above expression and the non-temporal characteristic value becomes a constant in front of the summation sign.

Various numerical code generation methods can be employed to produce codes having certain correlation and spectral properties. Such codes typically fall into one of two categories: designed codes and pseudorandom codes.

A designed code may be generated using a quadratic congruential, hyperbolic congruential, linear congruential, Costas array or other such numerical code generation technique designed to generate codes guaranteed to have certain correlation properties. Each of these alternative code generation techniques has certain characteristics to be considered in relation to the application of the pulse transmission system employing the code. For example, Costas codes have nearly ideal autocorrelation properties but somewhat less than ideal cross-correlation properties, while linear congruential codes have nearly ideal cross-correlation properties but less than ideal autocorrelation properties. In some cases, design tradeoffs may require that a compromise between two or more code generation techniques be made such that a code is generated using a combination of two or more techniques. An example of such a compromise is an extended quadratic congruential code generation approach that uses two 'independent' operators, where the first operator is linear and the second operator is quadratic.

Accordingly, one, two, or more code generation techniques or combinations of such techniques can be employed to generate a code without departing from the scope of the invention.

A pseudorandom code may be generated using a computer's random number generator, binary shift-register(s) mapped to binary words, a chaotic code generation scheme, or another well-known technique. Such 'random-like' codes are attractive for certain applications since they tend to spread spectral energy over multiple frequencies while having 'good enough' correlation properties, whereas designed codes may have superior correlation properties but have spectral properties that may not be as suitable for a given application.

Computer random number generator functions commonly employ the linear congruential generation (LCG) method or the Additive Lagged-Fibonacci Generator (ALFG) method. Alternative methods include inversive congruential generators, explicit-inversive congruential generators, multiple recursive generators, combined LCGs, chaotic code generators, and Optimal Golomb Ruler (OGR) code generators. Any of these or other similar methods can be used to generate a pseudorandom code without departing from the scope of the invention, as will be apparent to those skilled in the relevant art.

Detailed descriptions of code generation and mapping techniques are included in a co-owned patent application entitled "A Method and Apparatus for Positioning Pulses in Time", Ser. No. 09/638,150, which is hereby incorporated by reference.

It may be necessary to apply predefined criteria to determine whether a generated code, code family, or a subset of a code is acceptable for use with a given UWB application. Criteria to consider may include correlation properties, spectral properties, code length, non-allowable regions, number of code family members, or other pulse characteristics. A method for applying predefined criteria to codes is described in co-owned, co-pending application, entitled "A Method and Apparatus for Specifying Pulse Characteristics using a Code that Satisfies Predefined Criteria", Ser. No. 09/592,288, filed Jun. 12, 2000 and is incorporated herein by reference.

In some applications, it may be desirable to employ a combination of two or more codes. Codes may be combined sequentially, nested, or sequentially nested, and code combinations may be repeated. Sequential code combinations typically involve transitioning from one code to the next after the occurrence of some event. For example, a code with properties beneficial to signal acquisition might be employed until a signal is acquired, at which time a different code with more ideal channelization properties might be used. Sequential code combinations may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in desirable spectral properties. A method for applying code combinations is described in co-owned, co-pending application, entitled "A Method and Apparatus for Applying Codes Having Pre-Defined Properties", Ser. No. 09/591,690, filed Jun. 12, 2000 which is incorporated herein by reference.

Novel Direct-Path-Signal Detector Circuitry

This invention contemplates direct-path-signal (DPS) circuitry or DPS detector circuitry that identifies a direct-path signal in a signal that includes a plurality of pulses. In some embodiments, the invention relates to DPS detector circuitry that discriminates a direct-path signal in a radio signal received in a multipath environment.

Figure 9:
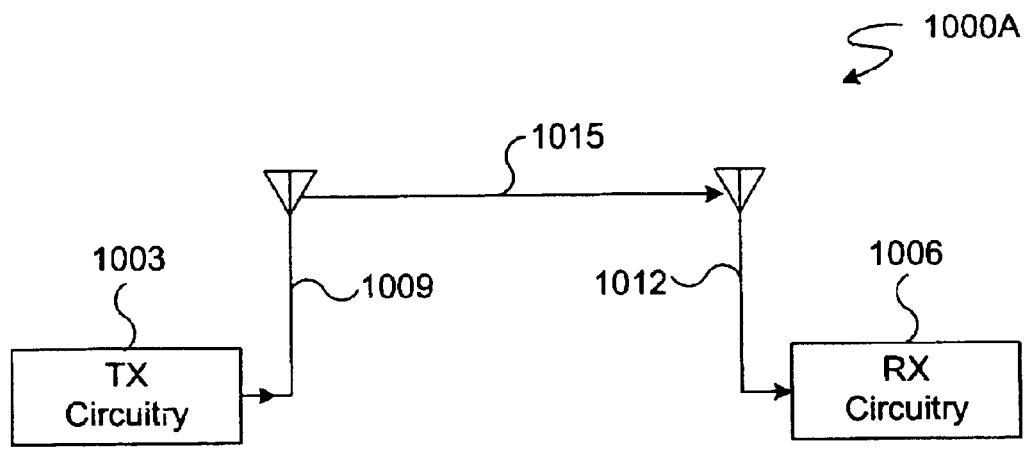
FIG. 9 depicts a communication system that includes a transmitter circuitry transmitting a radio signal to a receiver circuitry.

FIGS. 9–15 help to illustrate the desirability of distinguishing DPS signals in a communication, radar, ranging, or positioning system. FIG. 9 shows a communication system 1000A that includes a transmitter circuitry 1003 and a receiver circuitry 1006. The transmitter circuitry 1003 transmits a pulse to the receiver circuitry 1006 via a transmitter antenna 1009. The transmitted pulse travels via a direct-path 1015 in a propagation medium. The receiver 1006 receives the transmitted signal via a receiver antenna 1012.

Figure 10A:
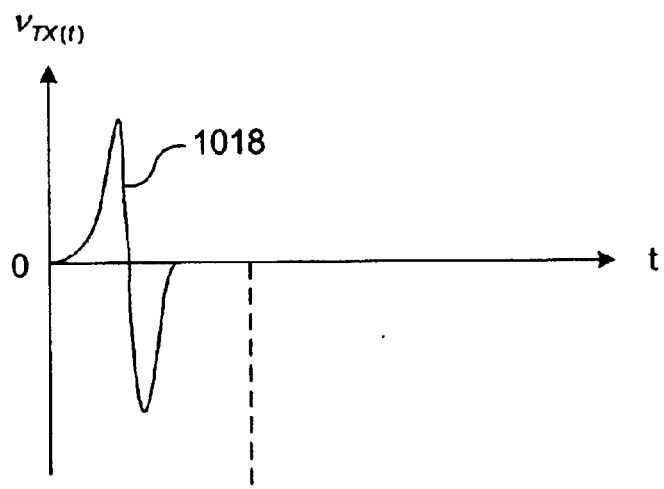
FIG. 10A illustrates a pulse transmitted by the transmitter circuitry in FIG. 9.
Figure 10B:
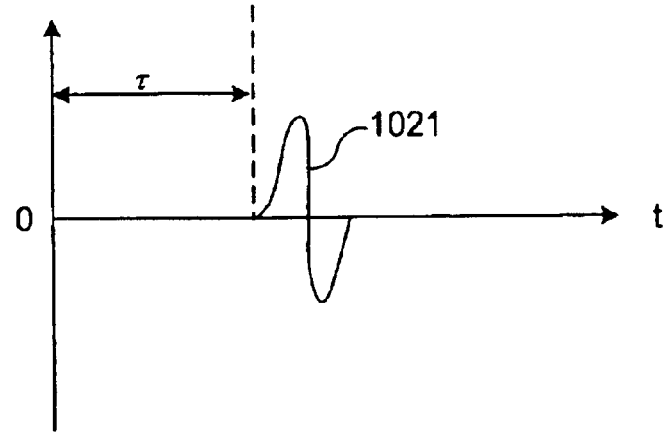
FIG. 10B depicts a pulse received by the receiver circuitry in the system shown in FIG. 9.

FIG. 10A shows the transmitted pulse 1018 as a function of time. In exemplary embodiments, the transmitted pulse 1018 comprises an ultra-wideband pulse, or a Gaussian monocycle. FIG. 10B depicts the received pulse 1021. Note that the received pulse 1021 has a delay, shown as τ in FIG. 10B, with respect to the transmitted pulse 1018. The delay τ represents the propagation delay from the transmitter circuitry 1003 to the receiver circuitry 1006 along the direct path 1015. In other words, the transmitter circuitry 1003 provides the pulse to the transmitter antenna 1009. The transmitter antenna 1009 transmits a pulse at t=0, i.e., the origin on the horizontal axis on the graphs in FIGS. 10A and 10B. The transmitted pulse propagates along the direct path 1015 from the transmitter antenna 1009 to the receiver antenna 1012. After the delay $\tau$, the transmitted pulse arrives at the receiver antenna 1012. The receiver antenna 1012 provides the received pulse to the receiver circuitry 1006. The receiver circuitry 1006 thereafter processes the received signal.

Figure 11:
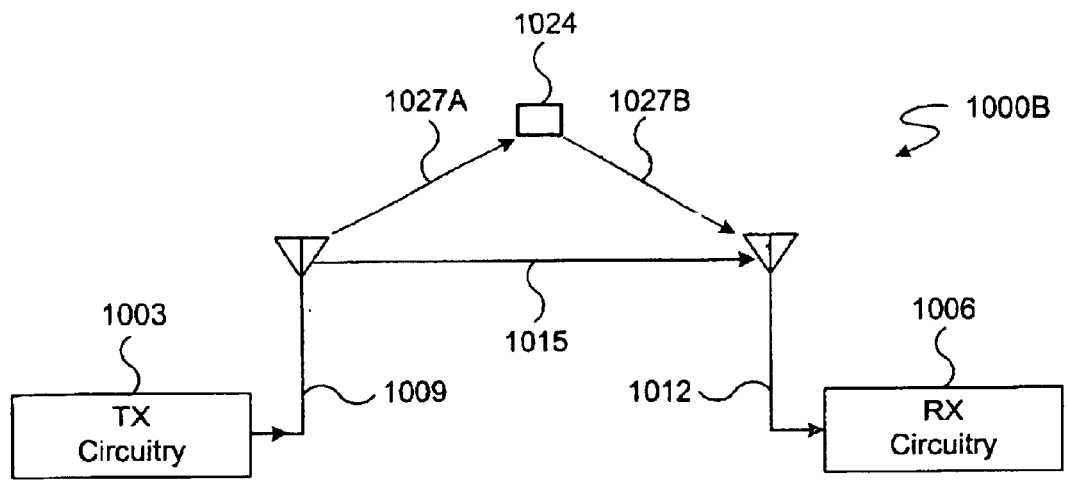
FIG. 11 shows a communication system that includes a transmitter circuitry and a receiver circuitry, wherein the transmitter circuitry transmits a pulse into a propagation medium that contains an object that causes multipath signals to arrive at the receiver circuitry.

FIG. 11 illustrates a communication system 1000B that includes a transmitter circuitry 1003 and a receiver circuitry 1006. The transmitter circuitry transmits a pulse to the receiver circuitry 1006 via a transmitter antenna 1009. The transmitted pulse propagates via a direct path 1015 in a propagation medium. The receiver 1006 receives the transmitted signal via a receiver antenna 1012. The propagation environment in FIG. 11 includes also an object 1024. The object 1024 may comprise a wall, a building, an obstruction, or the like.

Figure 12A:
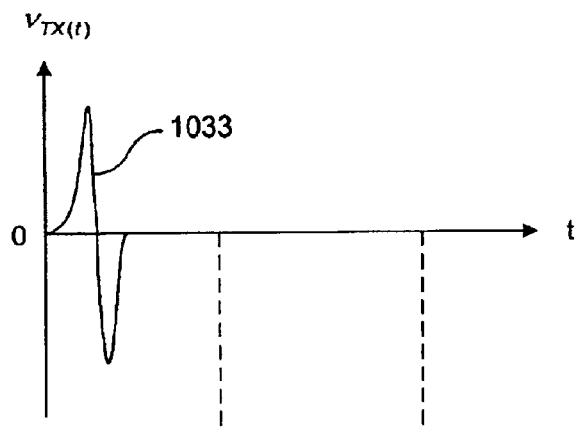
FIG. 12A depicts the signal that the transmitter circuitry transmits in the system of FIG. 11.
Figure 12B:
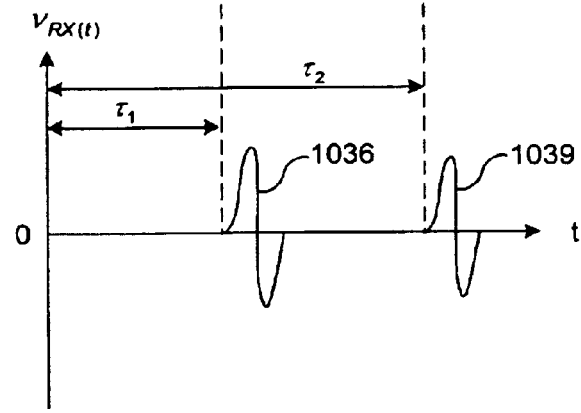
FIG. 12B shows the multipath signals that the receiver circuitry of FIG. 11 receives.

Unlike the system in FIG. 9, in the system of FIG. 11 the receiver circuitry 1006 receives two signals. FIG. 12A shows the transmitted pulse 1033 as a function of time. In exemplary embodiments, the transmitted pulse 1033 comprises an ultra-wideband pulse, or a Gaussian monocycle. FIG. 12B depicts two received pulses 1036 and 1039. A direct-path pulse 1036 corresponds to the signal that propagates along the direct path 1015. The direct-path signal 1036 arrives first at the receiver antenna 1012 and, therefore, constitutes the direct-path signal. The pulse 1036 reaches the receiver antenna after a delay shown as $\tau_1$ in FIG. 12B. The delay $\tau_1$ represents the propagation delay from the transmitter circuitry 1003 to the receiver circuitry 1006 along the direct-path 1015, as described above. As noted above, detecting the arrival of the direct-path signal 1036 is desirable and represents a challenge in many ranging and positioning applications. DPS detector circuits according to the invention provide a solution to that challenge.

The transmitted pulse also propagates to the object 1024 along a path 1027A. The pulse interacts with the object (e.g., reflects from the object) and thereafter propagates to the receiver antenna 1012 along a path 1027B. This second pulse 1039 arrives at the receiver antenna 1012 after a delay shown as $\tau_2$ in FIG. 12B. The delay $\tau_2$ represents the propagation delay from the transmitter circuitry 1003 to the receiver circuitry 1006 along the path 1027A and the path 1027B. In a typical application, $\tau_1$ and $\tau_2$ may differ from each other by a relatively small amount.

Figure 13:
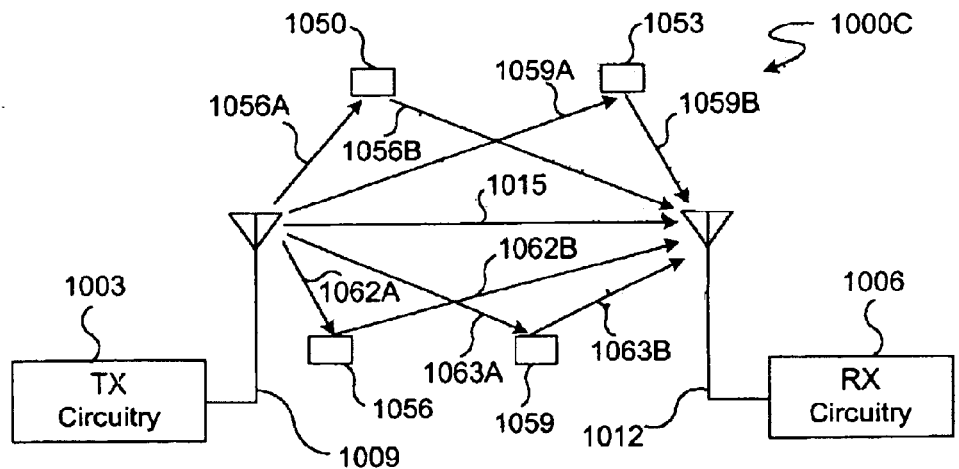
FIG. 13 illustrates a communication system that includes a transmitter circuitry and a receiver circuitry, wherein the transmitter circuitry transmits a pulse into a propagation medium that contains four objects that cause multipath signals to arrive at the receiver circuitry.

FIG. 13 illustrates a communication system 1000C that includes a transmitter circuitry 1003 and a receiver circuitry 1006. The transmitter circuitry transmits a pulse to the receiver circuitry 1006 via a transmitter antenna 1009. In exemplary embodiments, the transmitted pulse comprises an ultra-wideband pulse, or a Gaussian monocycle. The transmitted pulse propagates via a direct path 1015 in a propagation medium. The receiver 1006 receives the transmitted signal via a receiver antenna 1012. The propagation environment in FIG. 13 includes also four objects 1050, 1053, 1056, and 1059, respectively. Each of the four objects 1050, 1053, 1056, and 1059 may comprise a wall, a building, an obstruction, or the like. Thus, the receiver circuitry 1006 receives five signals. One of the five signals comprises the direct-path signal. The other four signals result from the interaction of the transmitted pulse with the objects 1050, 1053, 1056, and 1059.

In addition to the direct-path 1015, the transmitted pulse also travels along the paths 1056A–1056B, 1059A–1059B, 1062A–1062B, and 1063A–1063B. The paths 1056A–1056B, 1059A–1059B, 1062A–1062B, and 1063A–1063B constitute the paths that the transmitted pulse travels from the transmitter antenna 1009 to the objects 1050, 1053, 1056, and 1059, respectively, in a manner analogous to that described in connection with FIG. 11.

Figure 14A:
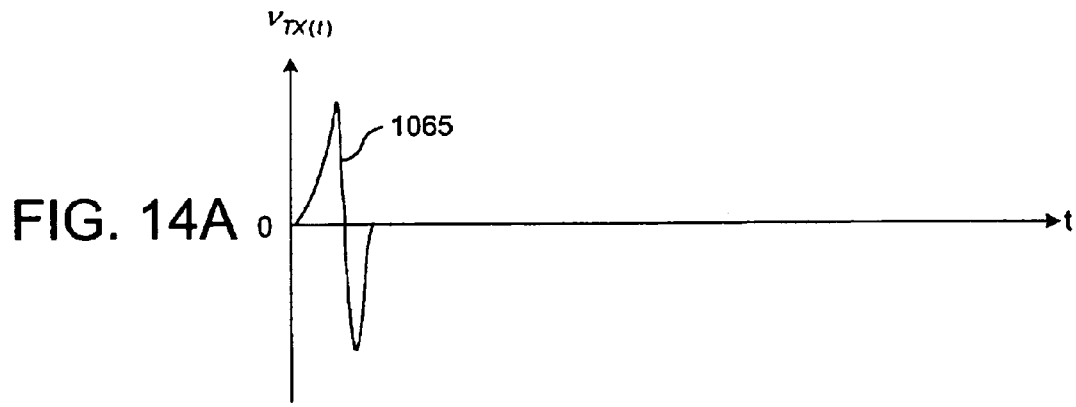
FIG. 14A depicts the signal that the transmitter circuitry transmits in the system of FIG. 13.
Figure 14B:
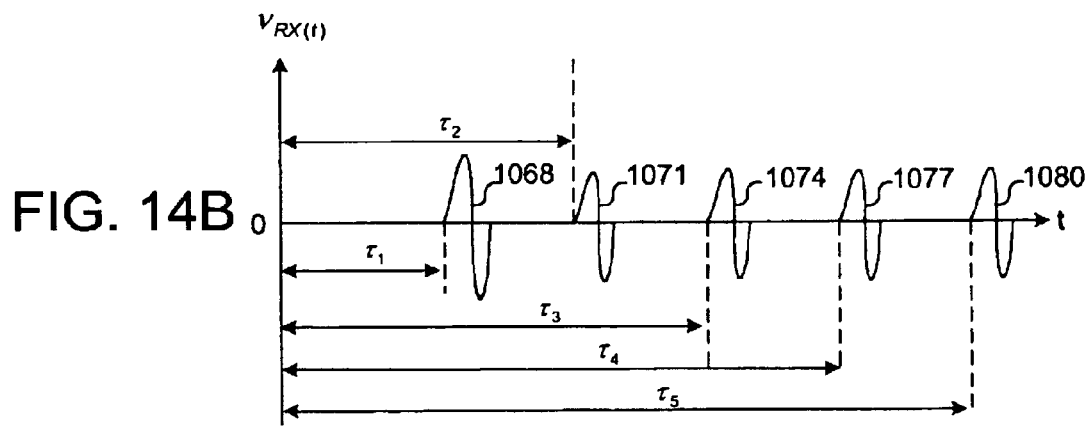
FIG. 14B shows the multipath signals that the receiver circuitry of FIG. 13 receives.

FIG. 14A shows the transmitted pulse 1065 as a function of time. In exemplary embodiments, the transmitted pulse 1065 comprises an ultra-wideband pulse, or a Gaussian monocycle. FIG. 14B depicts five received pulses 1068, 1071, 1074, 1077, and 1080, which correspond to signal paths 1015, 1056A–1056B, 1059A–1059B, 1062A–1062B, and 1063A–1063B, respectively. A direct-path pulse 1068 corresponds to the signal that propagates along the direct path 1015. The direct-path signal 1068 arrives first at the receiver antenna 1012 and, therefore, constitutes the direct-path signal. The pulse 1068 reaches the receiver antenna 1012 after a delay shown as $\tau_1$ in FIG. 14B. The delay $\tau_1$ represents the propagation delay from the transmitter circuitry 1003 to the receiver circuitry 1006 along the direct-path 1015, as described above. A DPS detector circuitry according to the invention detects the direct-path signal 1068.

The transmitted pulse also propagates to the objects 1050, 1053, 1056, and 1059, along paths 1056A, 1059A, 1062A, and 1063A, respectively. The transmitted pulse interacts with the objects 1050, 1053, 1056, and 1059 (e.g., reflects from the objects) and thereafter propagates to the receiver antenna 1012 along paths 1056B, 1059B, 1062B, and 1063B, respectively. The pulses 1071, 1074, and 1077 arrive at the receiver antenna 1012 after delays shown in FIG. 14B as $\tau_2$, $\tau_3$, $\tau_4$, and $\tau_5$, respectively. The delays $\tau_2$, $\tau_3$, $\tau_4$, and $\tau_5$ represent the propagation delays from the transmitter circuitry 1003 to the receiver circuitry 1006 along the paths 1056A–1056B, 1059A–1059B, 1062A–1062B, and 1063A–1063B, respectively.

FIGS. 11 and 13 show two and four objects within the multipath environments in which the communication systems 1000B and 1000C operate, respectively. A multipath environment, however, may include other numbers of objects, as persons skilled in the art would understand. In some circumstances, the multipath environment may include many objects or obstructions that give rise a correspondingly large number of multipath signals to arrive at a receiver circuitry.

Figure 15:
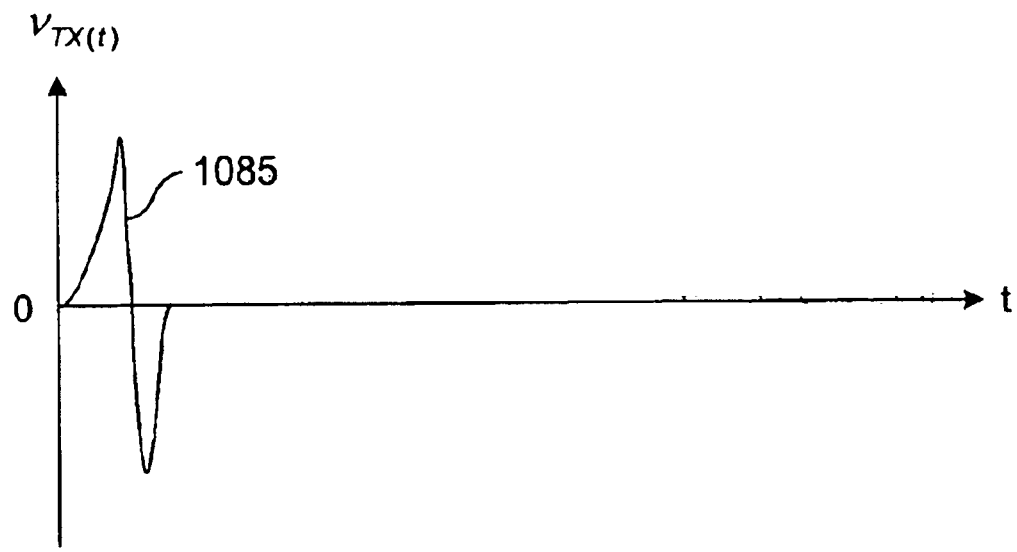
FIG. 15A depicts a signal that a transmitter circuitry transmits into a propagation medium that contains a plurality of objects that cause multipath signals to arrive at a receiver circuitry.
FIG. 15B shows the multipath signals corresponding to the transmitted signal of FIG. 15A that the receiver circuitry receives.
Figure 15:
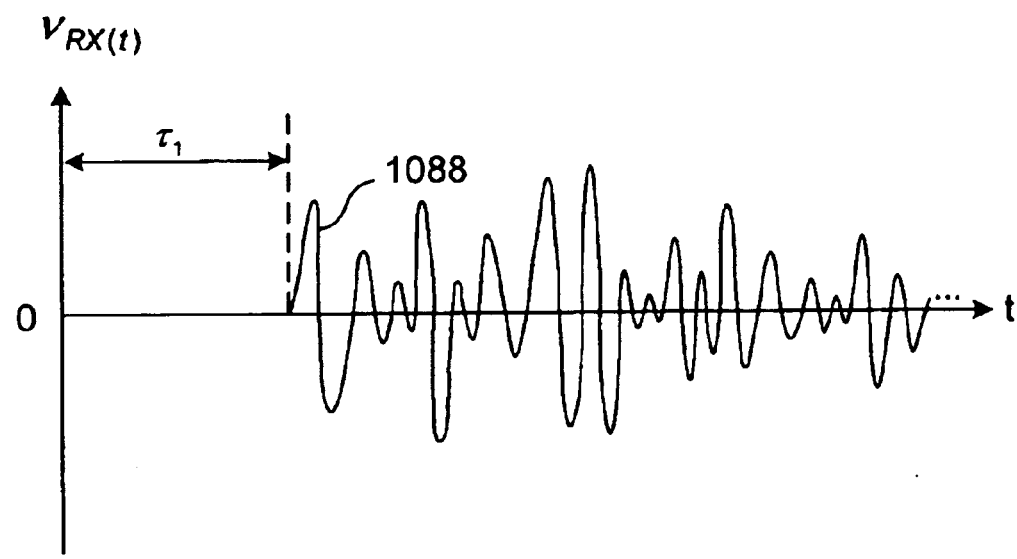

FIG. 15 shows the waveforms associated with a multipath environment that includes a plurality of objects or obstructions. FIG. 15A illustrates a transmitted pulse 1085 as a function of time. In exemplary embodiments, the transmitted pulse 1085 comprises an ultra-wideband pulse, or a Gaussian monocycle. FIG. 15B depicts a received signal 1088. The received signal 1088 includes a direct-path-signal that typically corresponds to the direct-path pulse. The received signal 1088 also includes a plurality of other pulses that correspond to the objects or obstructions within the multipath environment. Note that, because of interactions within the multipath environment, the pulses within the received signal 1088 may have varying peaks and amplitudes. In other words, constructive and destructive interference among the plurality of pulses arriving at the receiver circuitry may give rise to the plurality of pulses within the received signal 1088. A DPS detector circuitry according to the invention detects the direct-path signal in the received pulse 1088, thus helping to provide ranging and positioning systems with improved accuracy and resolution.

Figure 16:
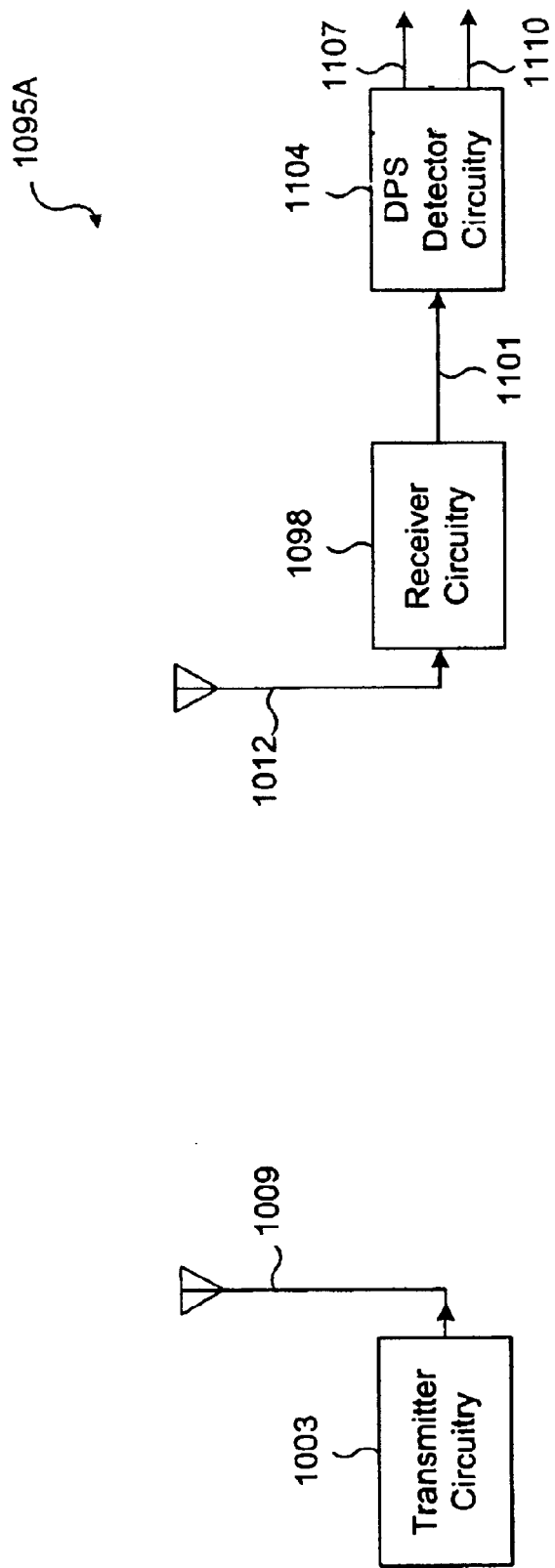
FIG. 16 illustrates a communication system that includes a transmitter circuitry, a receiver circuitry, and a direct-path signal (DPS) detector circuitry according to the invention.

FIG. 16 shows a communication system 1095A that includes a DPS detector circuitry 1104 according to the invention. The communication system 1095A includes a transmitter circuitry 1003, a receiver circuitry 1098, and the DPS detector circuitry 1104. The transmitter circuitry 1003 transmits radio signals to the receiver circuitry 1098 via a transmitter antenna 1009. A receiver antenna 1012 receives the transmitted signal and provides it to the receiver circuitry 1098.

The receiver circuitry 1098 communicates with the DPS detector circuitry 1104 via a link 1101. The link 1101 may comprise one or more signal lines, as desired. The link 1101 may provide a radio signal, or its processed, filtered, or reconstructed version, to the DPS detector circuitry 1104. The DPS detector circuitry 1104 accepts the signal from the receiver circuitry 1098 and processes it to detect the direct-path signal. The DPS detector circuitry 1104 may provide a signal or set of signals 1107 that includes information about the direct-path signal. The DPS detector circuitry may provide the signal 1107 to follow-on circuitry, for example, a processor circuitry, for further processing. The processor circuitry may comprise a digital-signal processor (DSP) or other types of processor. The DPS detector circuitry 1104 may provide another signal or set of signals 1110 that may include other information. For example, the signal or set of signals 1110 may provide the characteristics of the multipath environment, information about the received signal other than about the direct-path signal, e.g., information about the noise floor and the like.

DPS detector circuits according to the invention use information about the received signal, for example, the characteristics of its noise floor, to detect the direct-path signal. Thus, DPS detector circuits according to the invention process the received signal, which comprises a direct-path signal and, potentially, many other pulses that result from the interaction of the transmitted pulse with a multipath environment. In exemplary embodiments, a multiple-correlator scanning receiver provides the received signal to the DPS detector circuitry according to the invention.

Figure 17:
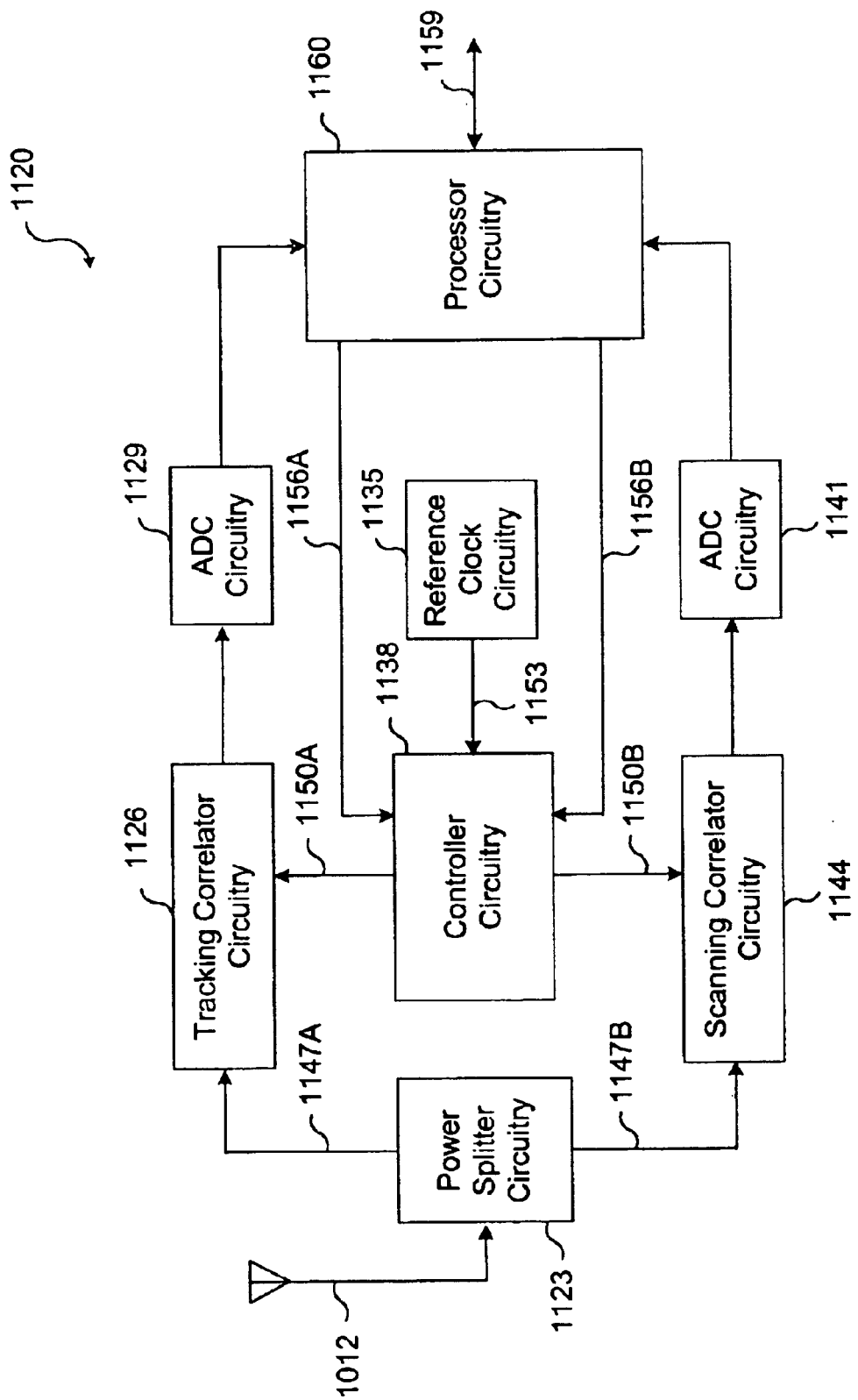
FIG. 17 shows a multiple-correlator receiver, or scanning receiver circuitry that comprises a tracking correlator circuitry and a scanning correlator circuitry.

FIG. 17 depicts a block diagram of a scanning receiver 1120 comprising two correlators 1126 and 1144, controlled by a controller circuitry 1138. Note, however, that one may use any number of correlators, as desired. One of the correlators is a tracking correlator 1126, which varies the phase of its internal coded template until it synchronizes with and is able to track the received pulse train. Any offset between the transmitted pulse repetition frequency and the receiver's internal pulse repetition frequency is detected as an error voltage in the correlation lock loop. Correlation lock loop as used in TM-UWB is described fully in U.S. Pat. No. 5,832,035, entitled, "Fast Locking Mechanism for Channelized Ultrawide-Band Communications," and is incorporated in its entirety herein by reference. Correlation Lock loop provides for acquisition and lock of an impulse radio signal. Further, commonly owned U.S. Patent Application, entitled, "System for Fast Lock and Acquisition of Ultra-Wideband Signals," Ser. No. 09/538,292,describes the most current methodologies for acquisition and fast lock and, again, is incorporated in its entirety here by reference.

The error in the correlation lock loop is corrected by synthesizing a frequency offset by the controller circuitry 1138. This adjustment ensures the receiver's clock is within approximately 20 ps RMS of the received signal. Once the tracking correlator 1126 is synchronized and locked to the incoming signal, the scanning correlator 1144 may sample the received waveform at precise time delays relative to the tracking point. By successively increasing the time delay while sampling the waveform, a complete, time-calibrated picture of the waveform can be collected. Also, the scanning correlator 1144 may scan prior to the tracking correlator, thus the tracking correlator will be delayed in respect to the scanning correlator. At the same time that waveform data is being captured, samples from the tracking correlator 1126 are also being collected. Samples from the scanning correlator 1144 and tracking correlator 1126 are collected in pairs so that events in the waveform sample set are time correlated with events in the data symbol set.

Functionally, and specifically in this embodiment, the incoming impulse RF signal is received via ultra-wideband antenna 1012. The signal is split in power splitter 1123, thereby being split among the designed number of correlators. The embodiment shown in FIG. 17 uses two correlators (tracking correlator 1126 and scanning correlator 1144). The tracking correlator 1126 and the scanning correlator 1144 are triggered by the controller circuitry 1138, using a reference clock circuitry 1135. In exemplary embodiments, the scanning receiver saves the scanned data points for further processing, for example, by the correlator circuitry of the DPS detector circuitry, as described below.

The output of the tracking correlator 1126 passes to analog-to-digital converter circuitry 1129 with the digital signal passing to processor circuitry 1160. The scanning correlator 1144 output also passes to analog-to-digital converter 1141 for input into the processor circuitry 1160. The processor circuitry 1160 may comprise a DSP, and performs signal processing on the signals it receives, as desired. For further details regarding scanning receivers, see commonly assigned U.S. patent application Ser. No. 09/537,264, filed on Mar. 29, 2000, and incorporated here in its entirety by reference.

Figure 18:
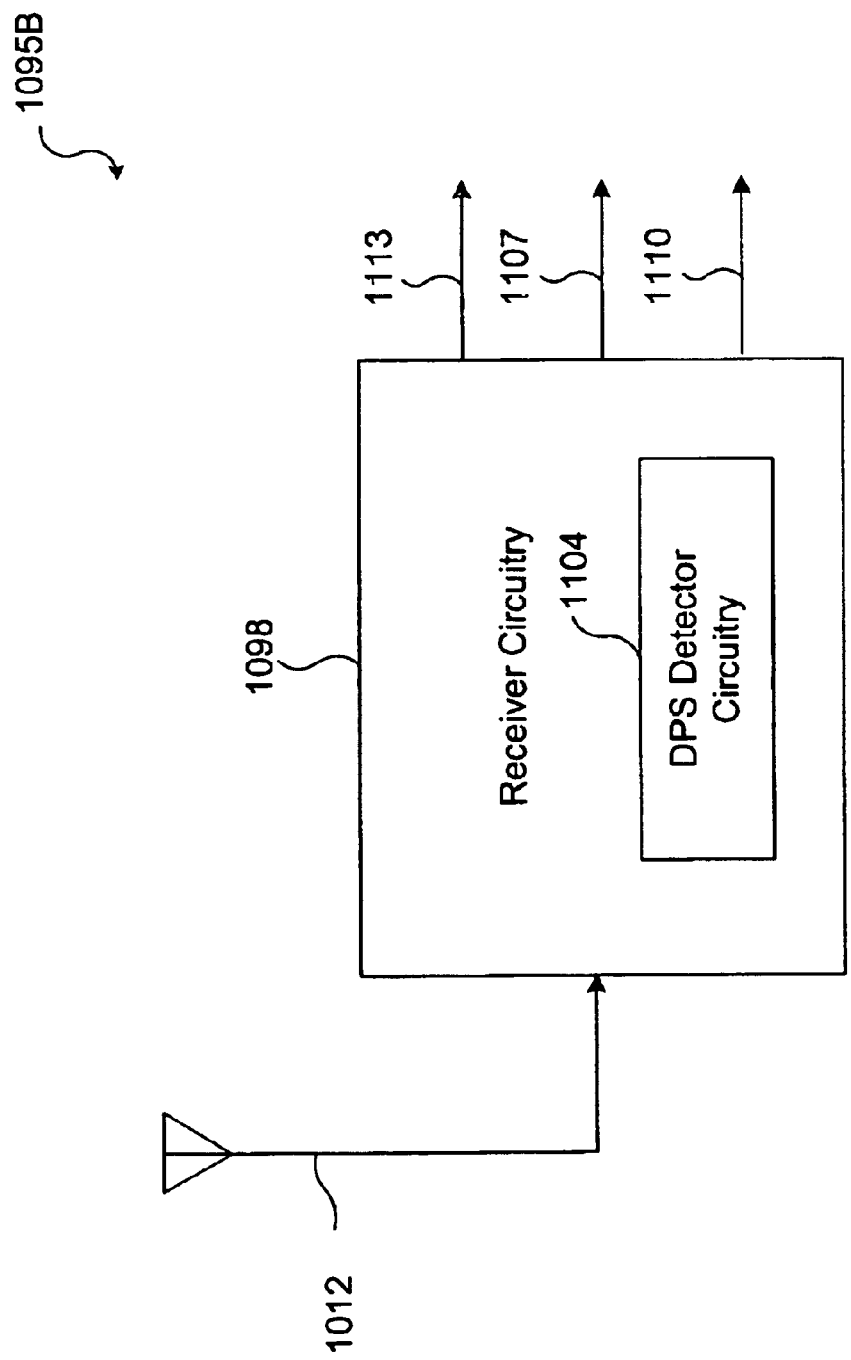
FIG. 18 depicts a receiver circuitry that includes DPS detector circuitry according to the invention.

FIG. 18 shows a block diagram 1095B of a receiver circuitry 1098 that includes a DPS detector circuitry 1104 according to the invention. Unlike the arrangement shown in FIG. 16, the DPS detector circuitry 1104 in FIG. 18 resides within the receiver circuitry 1098. Inclusion of the DPS detector circuitry 1104 within the receiver circuitry 1098 may allow circuit economies, or may allow more integration, as desired. The receiver circuitry 1098 provides a signal or set of signals 1107 and a signal or set of signals 1110 that serve a similar function as in FIG. 16. The receiver circuitry may also provide a signal or set of signals 1113 for interfacing to a processor circuitry (not shown in FIG. 18). The processor circuitry may comprise a DSP and may process signals that the receiver circuitry 1098 provides, as desired.

Figure 19:
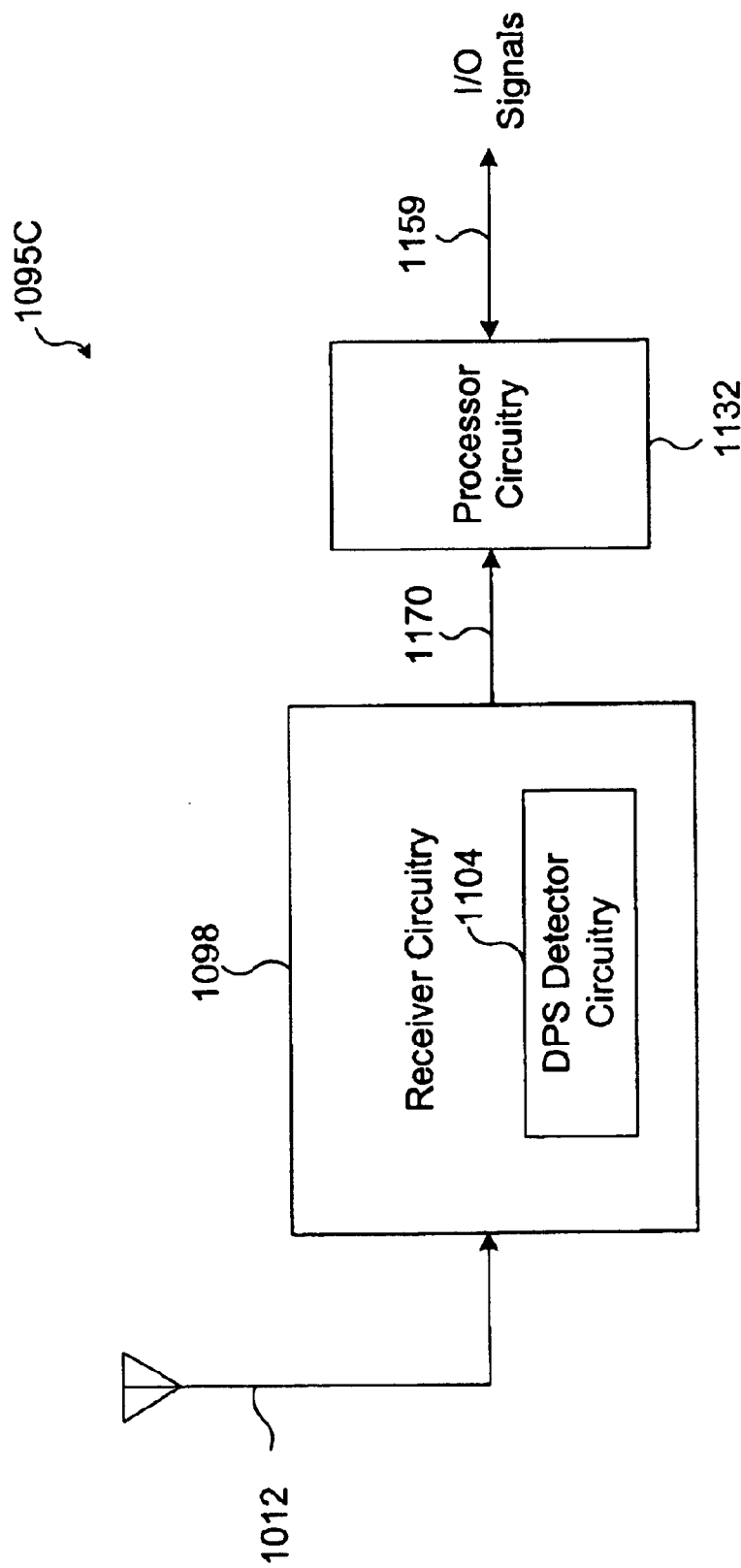
FIG. 19 illustrates a receiver circuitry that includes DPS detector circuitry according to the invention, wherein the receiver circuitry couples to a processor circuitry.

FIG. 19 illustrates a block diagram 1095C of a receiver circuitry 1098 that includes a DPS detector circuitry 1104 according to the invention. The receiver circuitry 1098 communicates with a processor circuitry 1132 through an interface 1170. The interface 1170 may include a plurality of signal lines to permit the receiver circuitry 1098, the DPS detector circuitry 1104, or both, to exchange data with the processor circuitry 1132. The processor circuitry 1132 may comprise a DSP or other type of processor, as desired.

The processor circuitry 1132 may process signals received from the receiver circuitry 1098, the DPS detector circuitry 1104, or both, as desired. For example, the processor circuitry 1132 may demodulate signals, perform filtering or reconstruction operations on signals, or perform computational operations on the signals it receives. The processor circuitry 1132 may communicate with external circuitry (not shown explicitly) through a set of input/output (I/O) lines 1159. The external circuitry may include, for example, a computer system, a network system, or communication equipment, input circuitry, output circuitry, storage circuitry, or the like, as desired.

Figure 20:
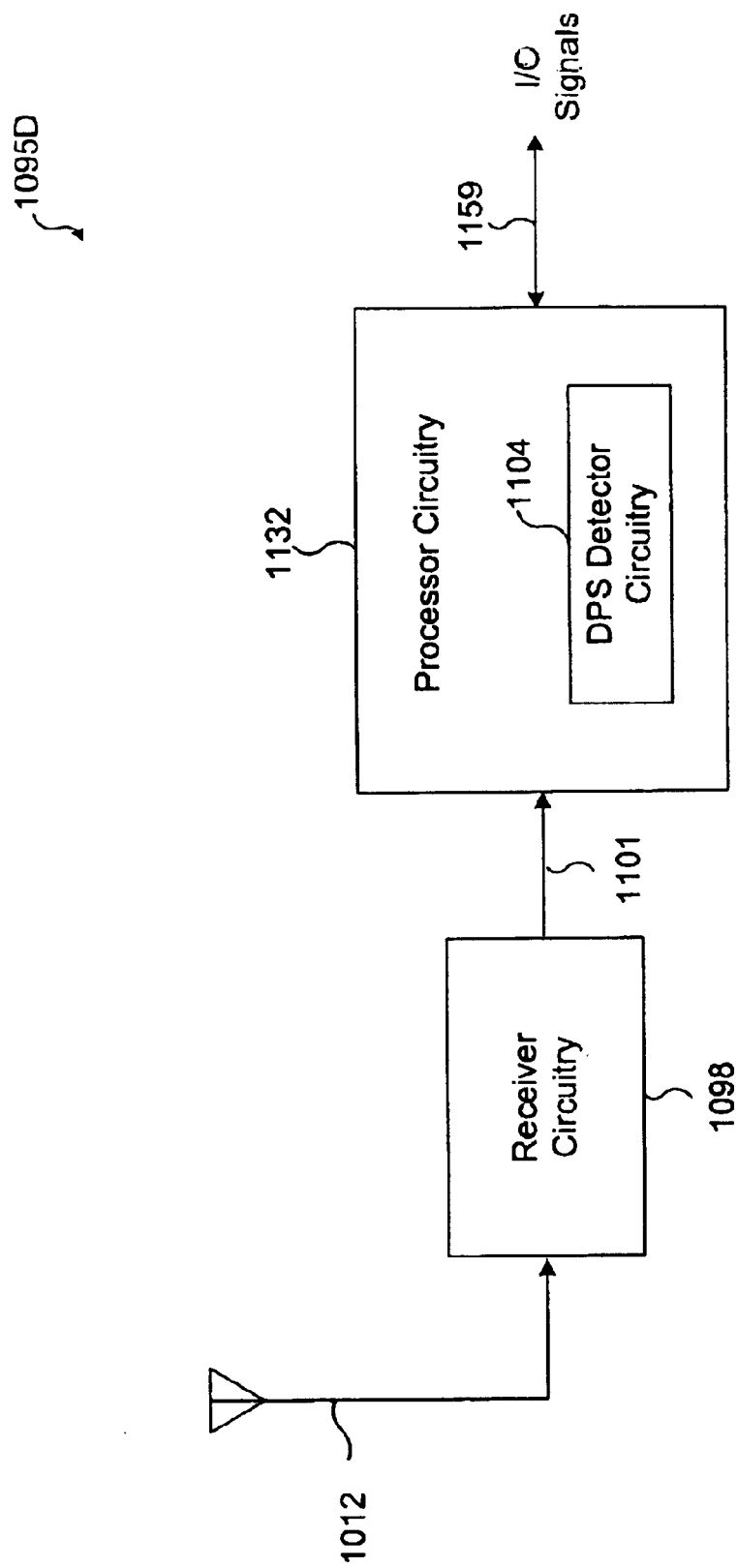
FIG. 20 shows receiver circuitry that couples to a processor circuitry, which comprises a DPS detector circuitry according to the invention.

FIG. 20 shows a block diagram 1095D of a receiver circuitry 1098 that communicates with a processor circuitry 1132 through a link 1101. The processor circuitry 1132 includes a DPS detector circuitry 1104. Thus, rather than residing in the receiver circuitry 1098, the DPS detector circuitry 1104 resides in the processor circuitry 1132. The processor circuitry 1132 may comprise a DSP or other type of processor, as desired. The processor circuitry 1132 may process signals received from the receiver circuitry 1098, as desired. For example, the processor circuitry 1132 may demodulate signals, perform filtering or reconstruction operations on signals, or perform computational operations on the signals it receives.

The processor circuitry 1132 may communicate with external circuitry (not shown explicitly) through a set of input/output (I/O) lines 1159. The external circuitry may include, for example, a computer system, a network system, or communication equipment, input circuitry, output circuitry, storage circuitry, or the like, as desired. To detect a direct-path signal, the DPS detector circuitry 1104 operates on signals it receives from the receiver circuitry 1098 via the link 1101.

Figure 21:
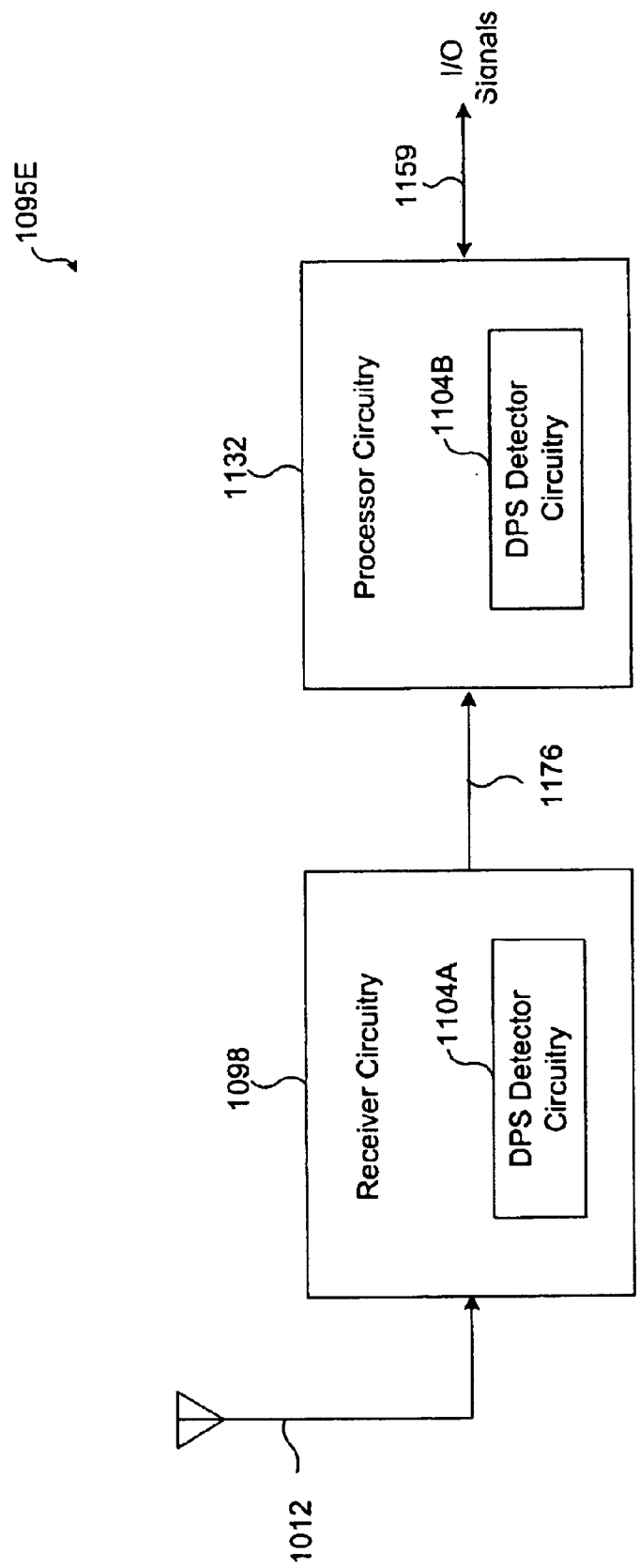
FIG. 21 depicts a receiver circuitry that couples to a processor circuitry, wherein the receiver circuitry and the processor circuitry contain DPS detector circuitry according to the invention.

FIG. 21 shows a block diagram 1095E of a receiver circuitry 1098 that communicates with a processor circuitry 1132 via an interface 1176. The processor circuitry 1132 may comprise a DSP or other type of processor. The processor circuitry 1132 may process signals received from the receiver circuitry 1098, as desired. For example, the processor circuitry 1132 may demodulate signals, perform filtering or reconstruction operations on signals, or perform computational operations on the signals it receives, as desired. The processor circuitry 1132 may communicate with external circuitry (not shown explicitly) through a set of input/output (I/O) lines 1159. The external circuitry may include, for example, a computer system, a network system, or communication equipment, input circuitry, output circuitry, storage circuitry, or the like, as desired.

The receiver circuitry 1098 includes a DPS detector circuitry 1104A. The processor circuitry 1132 also includes a DPS detector circuitry 1104B. The DPS detector circuitry 1104A and the DPS detector circuitry 1104B may include all or part of the functionality and circuitry of a DPS detector circuitry according to the invention, as desired. The choice of including full or partial functionality and circuitry of a DPS detector circuitry depends on application and system design considerations, as a person of ordinary skill in the art would understand.

The receiver circuitry 1098 and the processor circuitry 1132 may each include a DPS detector circuitry 1104 according to the invention. In other words, the DPS detector circuitry 1104A and the DPS detector circuitry 1104B include all or substantially all of the functionality, circuitry, or both, of a DPS detector circuitry according to the invention. In this case, each of the DPS detector circuitries 1104A and 1104B operate on the received signals. For example, the two DPS detector circuitries 1104A and 1104B may operate in a multiplexed manner, processing alternate frames of received data. As another example, the two DPS detector circuitries 1104A and 1104B may operate in a parallel manner.

Alternatively, the receiver circuitry 1098 and the processor circuitry 1132 may each include less than the full functionality, circuitry, or both, of a DPS detector circuitry according to the invention. Put another way, the DPS detector circuitry 1104A and the DPS detector circuitry 1104B may include less than all of the functionality, circuitry, or both, of a DPS detector circuitry according to the invention.

Here, the DPS detector circuitry 1104A may perform some of the operations involved in detecting a direct-path signal while the DPS detector circuitry 1104B may perform other operations involved in detecting a direct-path signal, as desired. Thus, the DPS detector circuitries 1104A and 1104B may coordinate the detection of a direct-path signal. The processor circuitry 1132, the receiver circuitry 1098, or both, may supervise the detection operations as desired, depending on a particular application.

Conceptually, the DPS detector circuitry according to the invention operates as follows. Before receiving a signal, the DPS detector circuitry evaluates the noise floor of the communication link or channel. The DPS detector circuitry receives from a receiver circuitry, for example, the receiver circuitry shown in FIG. 17, one or more "snapshots" of the noise floor present in the communication link in the absence of any data signal. Each snapshot includes a frame of numerical values that the receiver circuitry provides to the DPS detector circuitry.

For each snapshot or frame, the DPS detector circuitry calculates statistical attributes of the noise floor of the communication link. The DPS detector circuitry may calculate a variety of statistical attributes. In particular, the DPS detector circuitry calculates the standard deviation of the values corresponding to the noise floor. For multiple snapshots, the DPS detector circuitry calculates a standard deviation for each snapshot and stores the standard deviation values in a suitable location, for example, in an array or in memory or register files, for later processing.

The DPS detector circuitry next calculates an overall noise standard deviation. For a single snapshot, the DPS detector circuitry uses the standard deviation of that snapshot as the overall noise standard deviation. For multiple snapshots, the DPS detector circuitry calculates an average value of the standard deviations of the snapshots and uses the average value as the overall noise standard deviation. In either case, the DPS detector circuitry uses the overall noise standard deviation to calculate a threshold value, as described below in detail.

Next, the DPS detector circuitry receives from the receiver circuitry a set of values that represent a data frame (i.e., they correspond to a processed RF signal that includes data, as processed by the receiver circuitry). In other words, the receiver circuitry locks onto a transmission from a transmitter circuitry and acquires a frame of data. The data frame constitutes a scanned waveform. In exemplary embodiments of the invention, one may obtain a data frame using a suitable receiver circuitry, for example, the scanning receiver 1120 in FIG. 17.

The DPS detector circuitry processes the received data frame to detect the direct-path signal. More specifically, the DPS detector circuitry uses a plurality of sliding windows (as described below in detail) within the data frame. The sliding windows correspond to a selected collection of data points within the data frame. A sliding window may overlap with a successive sliding window, as desired.

For each sliding window, the DPS detector circuitry calculates statistical attributes. Specifically, the DPS detector circuitry calculates a standard deviation for each sliding window. The DPS detector circuitry stores the standard deviation values in a suitable location, for example, in an array, in memory, or a in a register file. Note that the sliding windows and, hence, the stored standard deviations, correspond to points along the data frame that the receiver circuitry provides to the DPS detector circuitry.

Next, the DPS detector circuitry compares each of the stored standard deviation values with the threshold values.

The location of the direct-path signal corresponds to the point in the data frame where the corresponding standard deviation value exceeds the threshold value. FIGS. 22–32 illustrate more details of how the DPS detector circuitry operates.

Figure 22:
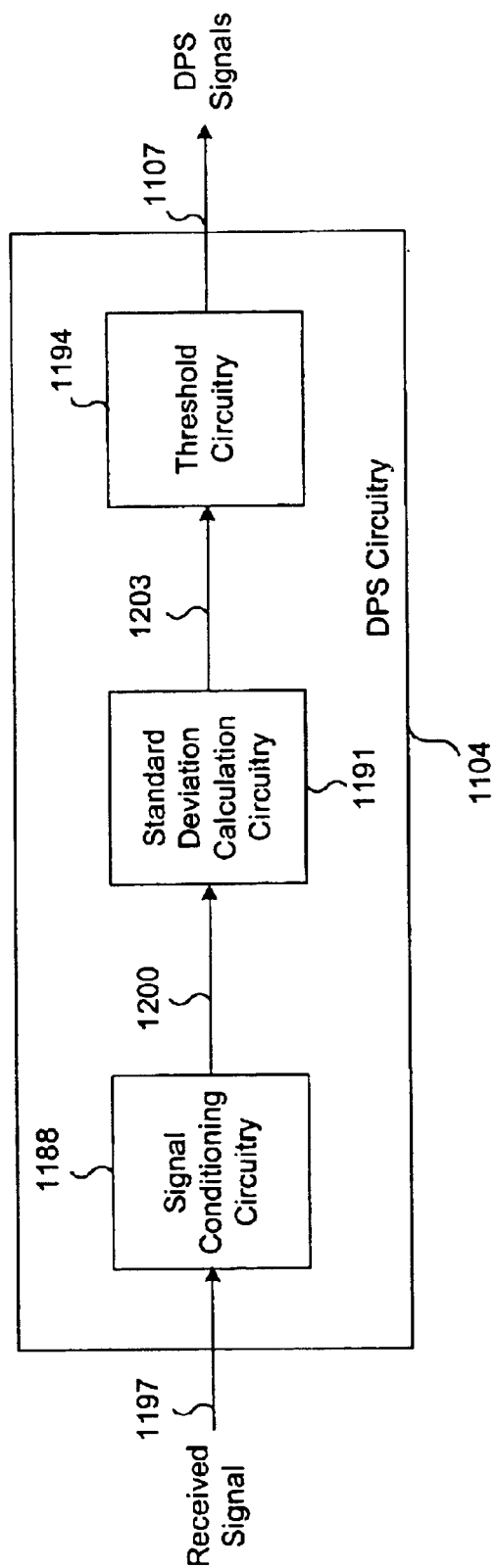
FIG. 22 illustrates one embodiment of a DPS detector circuitry according to the invention, which includes a standard deviation calculating circuitry and a threshold circuitry and, optionally, a signal-conditioning circuitry.

FIG. 22 shows a block diagram of an exemplary embodiment of a DPS detector circuitry 1104 according to the invention. The DPS detector circuitry 1104 comprises a standard deviation calculating circuitry 1191 and a threshold circuitry 1194. One may optionally include within the DPS detector circuitry 1104 a signal conditioning circuitry 1188. The signal conditioning circuitry may perform signal processing functions on a received signal 1197, as desired. The signal processing operations may include, for example, filtering, specialized signal processing, signal reconstruction, and the like. In exemplary embodiments, the received signal 1197 comprises an ultra-wideband RF signal that the scanning receiver circuitry of FIG. 17 has received and processed, as described above.

Note that, although FIG. 22 includes the signal conditioning circuitry 1188 within the DPS detector circuitry 1104, one may include the signal conditioning circuitry 1188, or its functionality, or both, in other locations, as desired. For example, one may include the signal conditioning circuitry 1188 or its functionality in a processor circuitry, such as a DSP. As an alternative, one may include the signal conditioning circuitry 1188 or its functionality in a suitable receiver circuitry, such as the scanning receiver circuitry shown in FIG. 17.

The standard deviation calculating circuitry 1191 receives an input signal 1200. The input signal 1200 may comprise an RF signal as received and processed by a receiver circuitry, for example, the scanning receiver circuitry shown in FIG. 17. The input signal 1200 may alternatively comprise the signal provided by the receiver circuitry, as further processed by the optional signal conditioning circuitry 1188. In either case, the input signal 1200 includes frames of values that correspond to the received RF signal. In exemplary embodiments, the input signal comprises frames of values that correspond to the received ultra-wideband RF signals that the scanning receiver circuitry shown in FIG. 17 provides. Note that the frames of values may represent a noise floor in the absence of any received data signal. Conversely, when the receiver circuitry receives an RF signal that includes data, the frames of values, at least in part, represent the received signal.

The standard deviation calculating circuitry 1191 performs two roles. In its first role, as described above, the standard deviation calculating circuitry 1191 calculates an overall noise standard deviation of the communication link or channel. More specifically, the standard deviation calculating circuitry 1191 calculates one or more standard deviation values that correspond, respectively, to one or more snapshots of the noise floor of the communication link or channel. The standard deviation calculating circuitry 1191 stores the standard deviation value or values in a suitable location (not shown explicitly in FIG. 22).

Figure 26:
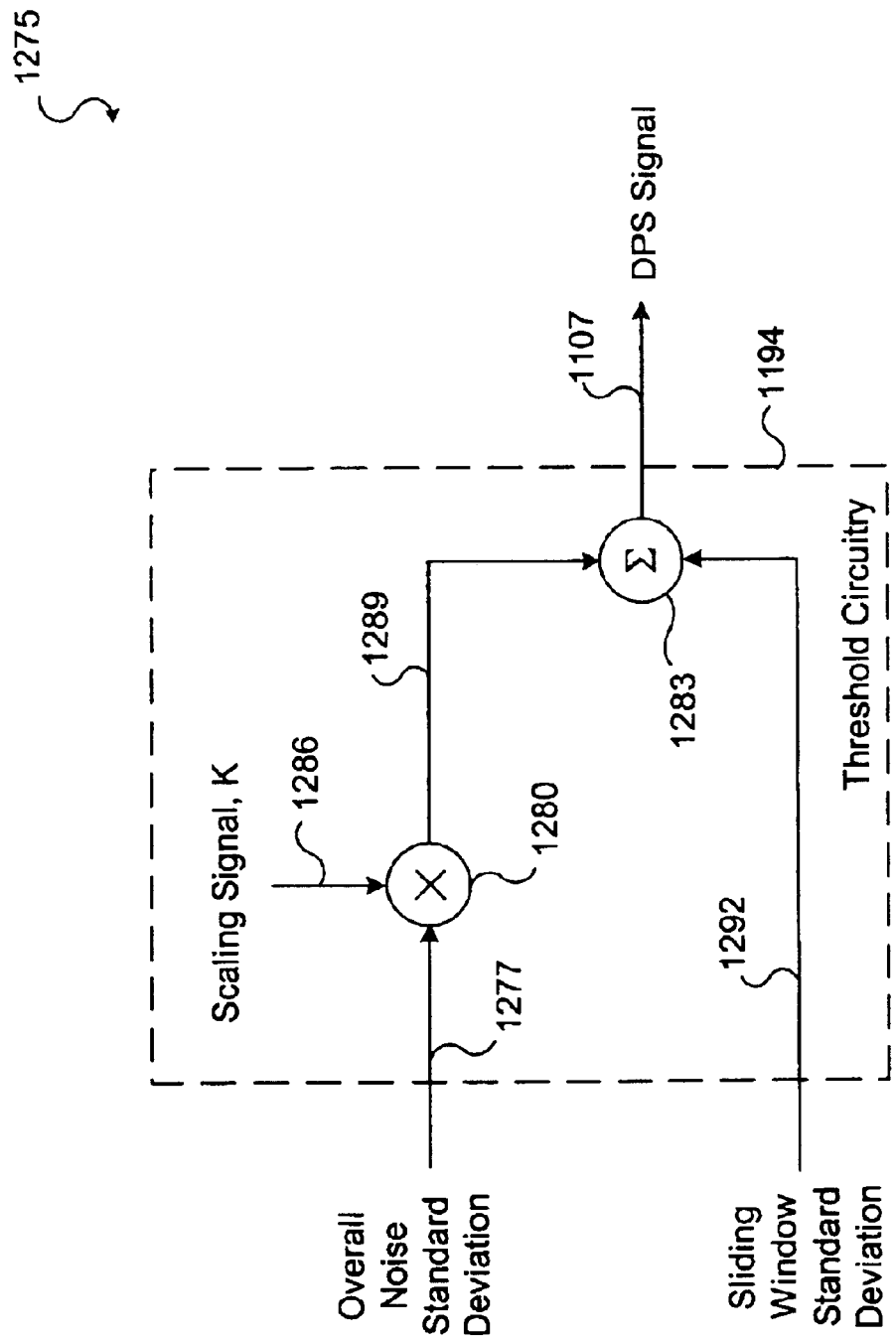
FIG. 26 shows a block diagram of a threshold circuitry that a DPS detector circuitry according to the invention may use.

In its second role, as described above, the standard deviation calculating circuitry 1191 determines the standard deviations of a set of values that fall within sliding windows within a data frame of the input signal 1200, as described in more detail below. The standard deviation calculating circuitry 1191 stores the standard deviations in a suitable location (not shown explicitly in FIG. 22) and provides the calculated standard deviation values via a link 1203 to the threshold circuitry 1194. Alternatively, the standard deviation calculating circuitry 1191 may provide the calculated standard deviation values to the threshold circuitry 1194 and the threshold circuitry 1194 may store the values in a suitable location (not shown explicitly in FIG. 22). In either case, the threshold circuitry 1194 in turn supplies a signal or set of signals 1107 that includes information about the direct-path signal in the received RF signal. FIG. 26 and its accompanying discussion below provide more details about the threshold circuitry 1194 and its operation.

Note that, rather than using a standard deviation calculating circuitry 1191 that performs two roles (in effect time-multiplexing the standard deviation calculating circuitry 1191), one may use two distinct standard deviation calculating circuitries, as desired. In other words, one may use a standard deviation calculating circuitry that calculates an overall noise standard deviation value (used to calculate a threshold). In addition, one may use a second standard deviation calculating circuitry that calculates the standard deviation values for the sliding windows within a data frame. The choice of which implementation to use depends on a variety of factors, for example, the available resources, the desired performance, and the like, as persons of ordinary skill in the art would understand.

Figure 23:
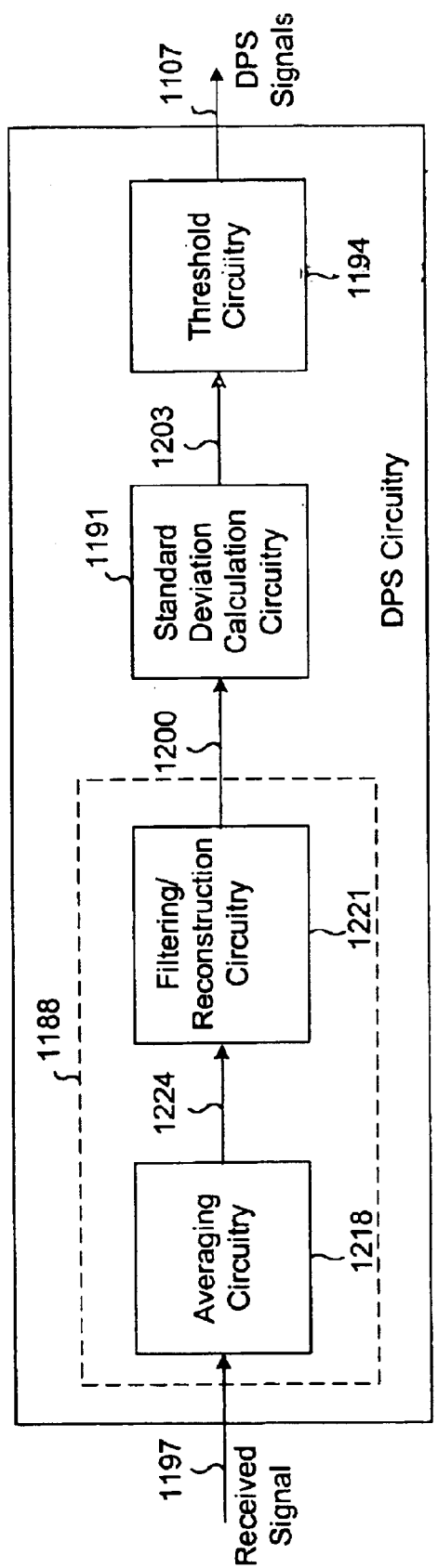
FIG. 23 shows more details of an embodiment of a DPS detector circuitry according to the invention.

FIG. 23 shows another embodiment of a DPS detector circuitry 1104 according to the invention. The embodiment includes a standard deviation calculating circuitry 1191, a threshold circuitry 1194, and an optional signal conditioning circuitry 1188. These components operate similarly to those described above in connection with FIG. 22. FIG. 23, however, shows more details of the optional signal conditioning circuitry 1188. The signal conditioning circuitry comprises an averaging circuitry 1218 and a filtering/reconstruction circuitry 1221.

The averaging circuitry 1218 performs averaging operations on the received signals 1197 and provides an output signal 1224 to the filtering/reconstruction circuitry 1221. Rather than residing within the signal conditioning circuitry 1188, the averaging circuitry 1218, its functionality, or both, may reside in other locations, for example, within the scanning receiver circuitry shown in FIG. 17. The filtering/reconstruction circuitry 1221 may perform signal processing operations, for example, filtering operations.

Figure 24:
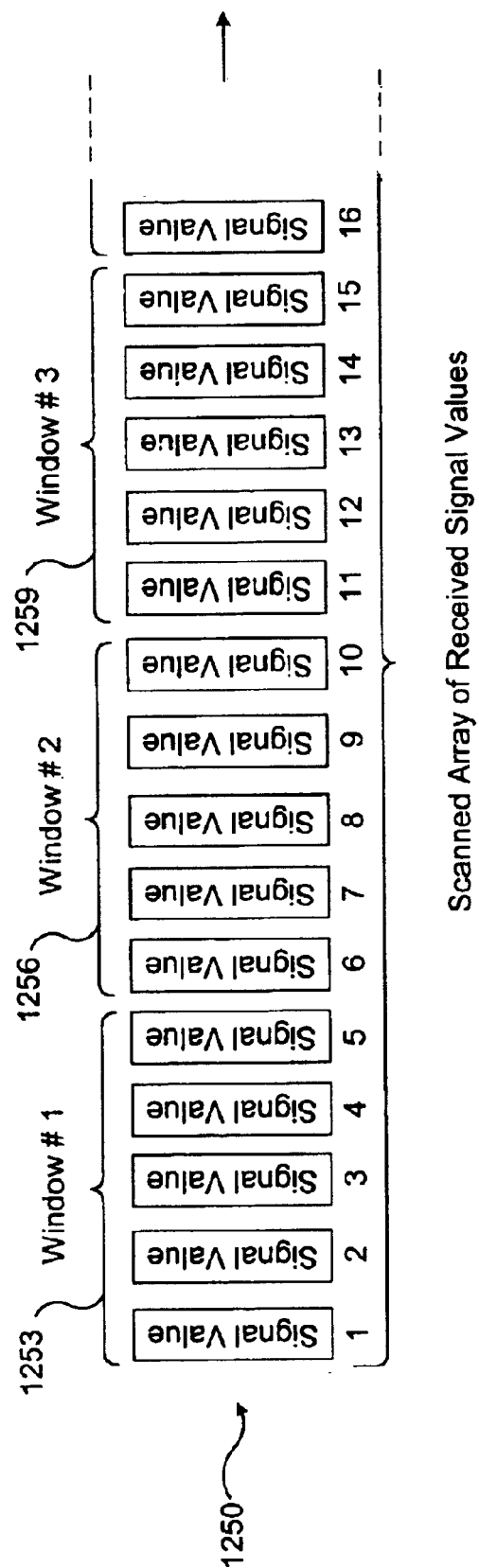
FIG. 24 depicts a plurality of non-overlapping data windows that the DPS detector circuitries according to the invention may use.

FIG. 24 shows an arrangement of conceptual windows in a received data frame. The data frame corresponds to the received RF data signal or signals. As noted above, in exemplary embodiments, a scanning receiver, for example, the receiver shown in FIG. 17, provides the data frames. The standard deviation calculating circuitry 1191 (see FIGS. 22 and 23 and their respective descriptions) operates on data values in the conceptual windows within the data frames. In other words, starting with the data frame 1250, one divides the data frame 1250 into a set of data values. Each set of data values corresponds to a window. Thus, the data frame 1250 comprises windows 1253, 1256, 1259, and so on.

Note that generally the data frame 1250 includes the set of signal values ordered in time. In other words, the first signal value within data frame 1250 corresponds to the earliest signal value in time, and so on. Each of the windows 1253, 1256, 1259, and so on, includes its respective set of data values ordered in time. Furthermore, data frame 1250 includes windows 1253, 1256, 1259, and so on, ordered in time. Thus, the first window, window 1253 represents the earliest window in time, the second window 1256 corresponds to the second window in time, and so forth.

In exemplary embodiments of the invention, each of the windows 1253, 1256, 1259, and so on, may contain five data points. Note, however, that one may a variety of numbers of data points, as desired. For example, in other embodiments of the invention, each of the windows 1253, 1256, 1259, and so on, may include 20 or 30 data points. The number of data points depends on the specifications and desired performance in a given implementation, as persons of ordinary skill in the art would understand.

The standard deviation circuitry 1191 (see FIGS. 22 and 23) operates on the data values within each of the windows 1253, 1256, 1259, etc. The standard deviation circuitry 1191 determines the statistical standard deviation for each set of data values within the windows 1253, 1256, 1259, etc. The threshold circuitry 1194 compares the resulting standard deviation signals with a threshold signal to determine the presence of a direct-path signal. Note that the windows 1253, 1256, 1259, etc., in FIG. 24 do not overlap with each other. Put another way, the sets of data points within the windows are mutually exclusive.

Figure 25:
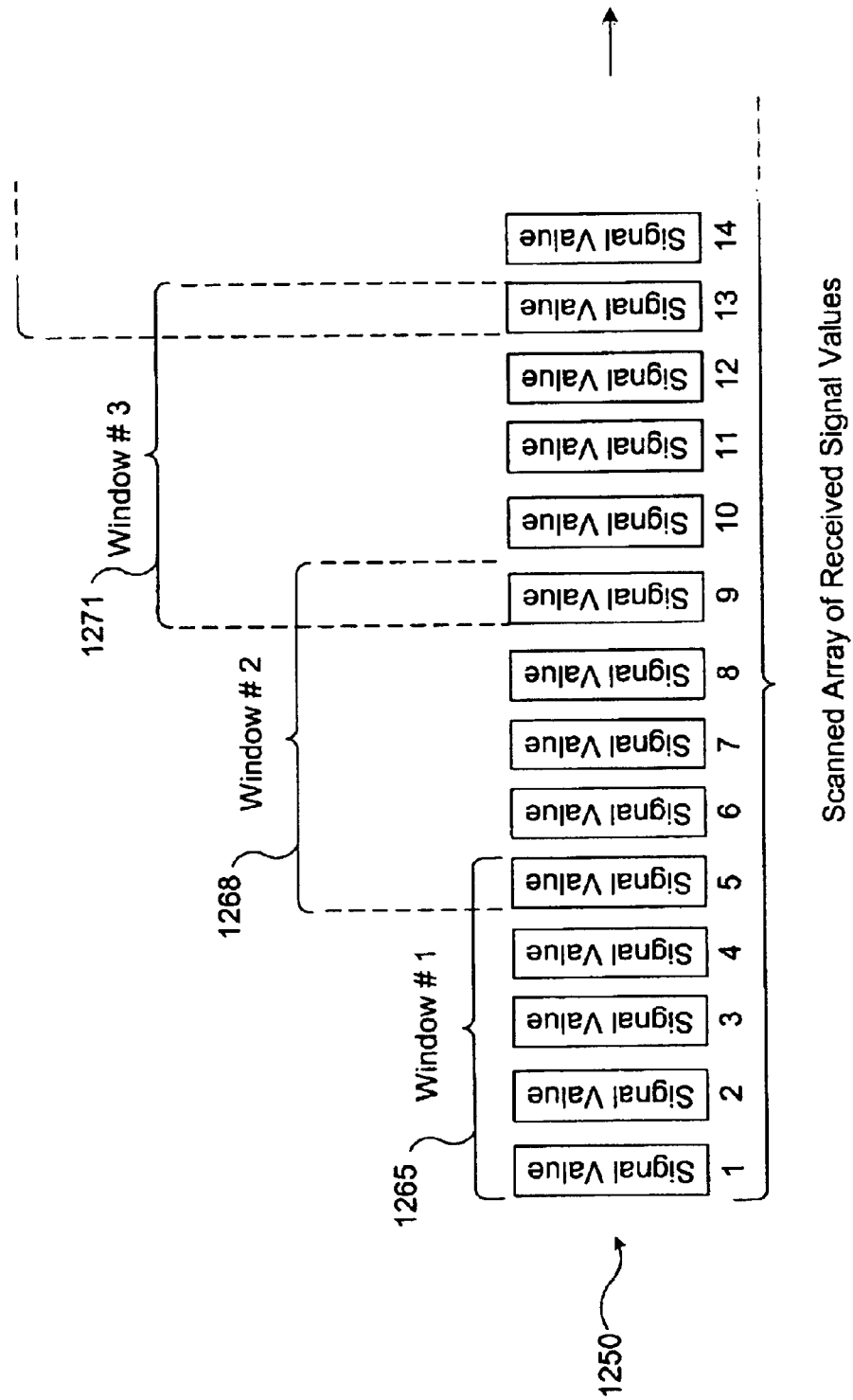
FIG. 25 illustrates a plurality of overlapping data windows that the DPS detector circuitries according to the invention may use.

FIG. 25 depicts another arrangement of conceptual windows in a received data frame. The data frame corresponds to a received RF data signal or signals. As noted above, in exemplary embodiments, a scanning receiver, for example, the receiver shown in FIG. 17, provides the data frames. The standard deviation calculating circuitry 1191 (see FIGS. 22 and 23) operates on data values in conceptual windows within the data frames. Starting with the data frame 1250, one divides the data frame 1250 into a set of data values. Each set of data values corresponds to a window. Thus, the data frame 1250 comprises windows 1265, 1268, 1271, and so on.

Note that generally the data frame 1250 includes the set of signal values ordered in time. In other words, the first signal value within data frame 1250 corresponds to the earliest signal value in time, and so on. Each of the windows 1265, 1268, 1271, and so on, includes its respective set of data values ordered in time. Furthermore, data frame 1250 includes windows 1265, 1268, 1271, and so on, ordered in time. Thus, the first window, window 1265 represents the earliest window in time, the second window 1268 corresponds to the second window in time, and so forth.

As noted above with respect to FIG. 24, in exemplary embodiments of the invention, each of the windows 1265, 1268, 1271, and so on, may contain five data points. Note, however, that one may a variety of numbers of data points, as desired. For example, in other embodiments of the invention, windows 1265, 1268, 1271, and so on, may each include 20 or 30 data points. The number of data points depends on the specifications and desired performance in a given implementation, as persons of ordinary skill in the art would understand.

The standard deviation circuitry 1191 (see FIGS. 22 and 23) operates on the data values within each of the windows 1265, 1268, 1271, and so on. The standard deviation circuitry 1191 determines the statistical standard deviation for each set of data values within the windows 1265, 1268, 1271, and so on. As with the embodiment shown in FIG. 24, the threshold circuitry 1194 in FIG. 23 compares the resulting standard deviation signals with a threshold signal to determine the presence of a direct-path signal.

Note that, unlike the windows 1253, 1256, 1259, etc., in FIG. 24, the windows 1265, 1268, 1271, etc., in FIG. 25 overlap with each other. Put another way, the set of data points within the windows are mutually inclusive. Each of the windows 1265, 1268, 1271, and so on, overlaps with a succeeding window by one data point. One, however, may use windows that overlap by other numbers of data points, as desired, and depending on a particular application.

FIG. 26 illustrates an exemplary embodiment 1275 of the threshold circuitry 1194. The threshold circuitry 1194 comprises a multiplier circuitry 1280 and a summing circuitry 1283. The multiplier circuitry 1280 receives overall noise standard deviation 1277, $\sigma_{noise}$. The standard deviation calculating circuitry 1191 may provide the overall noise standard deviation 1277, if one uses a time-multiplexed approach, as described above. Alternatively, another suitable circuitry, for example, a circuitry configured to calculate standard deviation values, may provide the overall noise standard deviation 1277.

The multiplier circuitry 1280 also receives a signal 1286 that corresponds to a scaling factor, K. The multiplier circuitry 1280 produces a product signal 1289, given by $$P = K \cdot \sigma_{noise}.$$

The product signal 1289, P, constitutes a threshold signal. The threshold circuitry 1194 uses the product signal 1289 as a threshold signal to detect the location of the direct-path signal within a received data frame.

The multiplier circuitry 1280 provides the product signal 1289 to the summing circuitry 1283. The summing circuitry 1289 compares the product signal 1289 to a sliding window standard deviation 1292. The sliding window standard deviation 1292 represents the standard deviation for one of the sliding windows, for example, as depicted in FIGS. 24 and 25. The sliding window standard deviation 1292 values originate from the stored values of the sliding window standard deviations. In other words, data processing circuitry (not shown explicitly in FIG. 26) provides successive values of sliding window standard deviation to the summing circuitry 1289.

The summing circuitry 1283 provides as its output signal 1107 the difference between the sliding window standard deviation 1292 and the product signal (i.e., the threshold signal) 1289. Put another way, the summing circuitry 1283 subtracts the product signal 1289 from the sliding window standard deviation 1292. Note that FIG. 26 depicts a conceptual embodiment of the threshold circuitry 1194, and one may realize the same functionality in a variety of different ways, for example, using hardware, software, or a combination of hardware and software, as desired. Furthermore, one may implement in a variety of ways the data processing circuitry (not shown explicitly in FIG. 26) that provides successive values of sliding window standard deviation to the summing circuitry 1289. For example, the data processing circuitry may constitute a state machine, or part of the standard deviation calculating circuitry 1191, or other suitable circuitry, as persons skilled in the art would understand.

Figure 27:
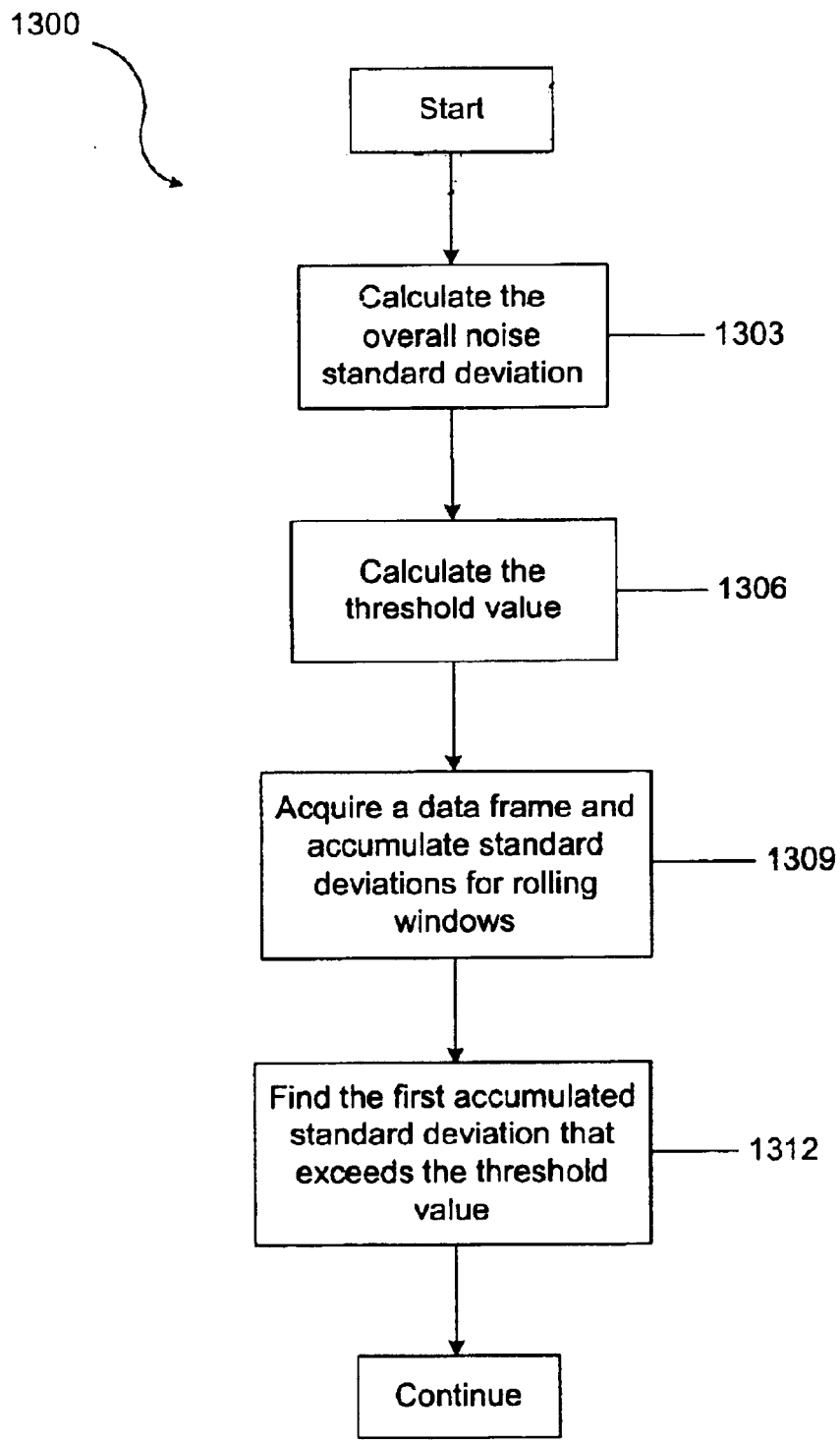
FIG. 27 depicts a flow diagram that shows generally the steps that a DPS detector circuitry according to the invention performs.

FIG. 27 shows a flow diagram 1300 of operations that a DPS detector circuitry according to the invention performs. The operations begin at step 1303. In that step, the DPS detector circuitry calculates the overall noise standard deviation by taking one or more snapshots of the noise floor of the communication link and calculating an average standard deviation, as described above. The DPS detector circuitry thereafter calculates in step 1306 standard a threshold, $P = K \cdot \sigma_{noise}$.

In step 1309, the DPS detector circuitry according to the invention acquires a data frame, selects conceptual rolling windows within the data values corresponding to the data frame. The DPS detector circuitry also calculates and accumulates (i.e., stores) standard deviation values for the data values within each rolling window. Finally, in step 1312, the DPS detector circuitry according to the invention finds the first (i.e., earliest in time) accumulated or stored standard deviation for a rolling window that exceeds the threshold value. That standard deviation denotes the position of the direct-path signal within the data frame. The DPS detector circuitry according to the invention may repeat one or more of the steps shown in FIG. 26 to determine and update the direct-path signal, as desired, for example, in response to new received signals.

Figure 28:
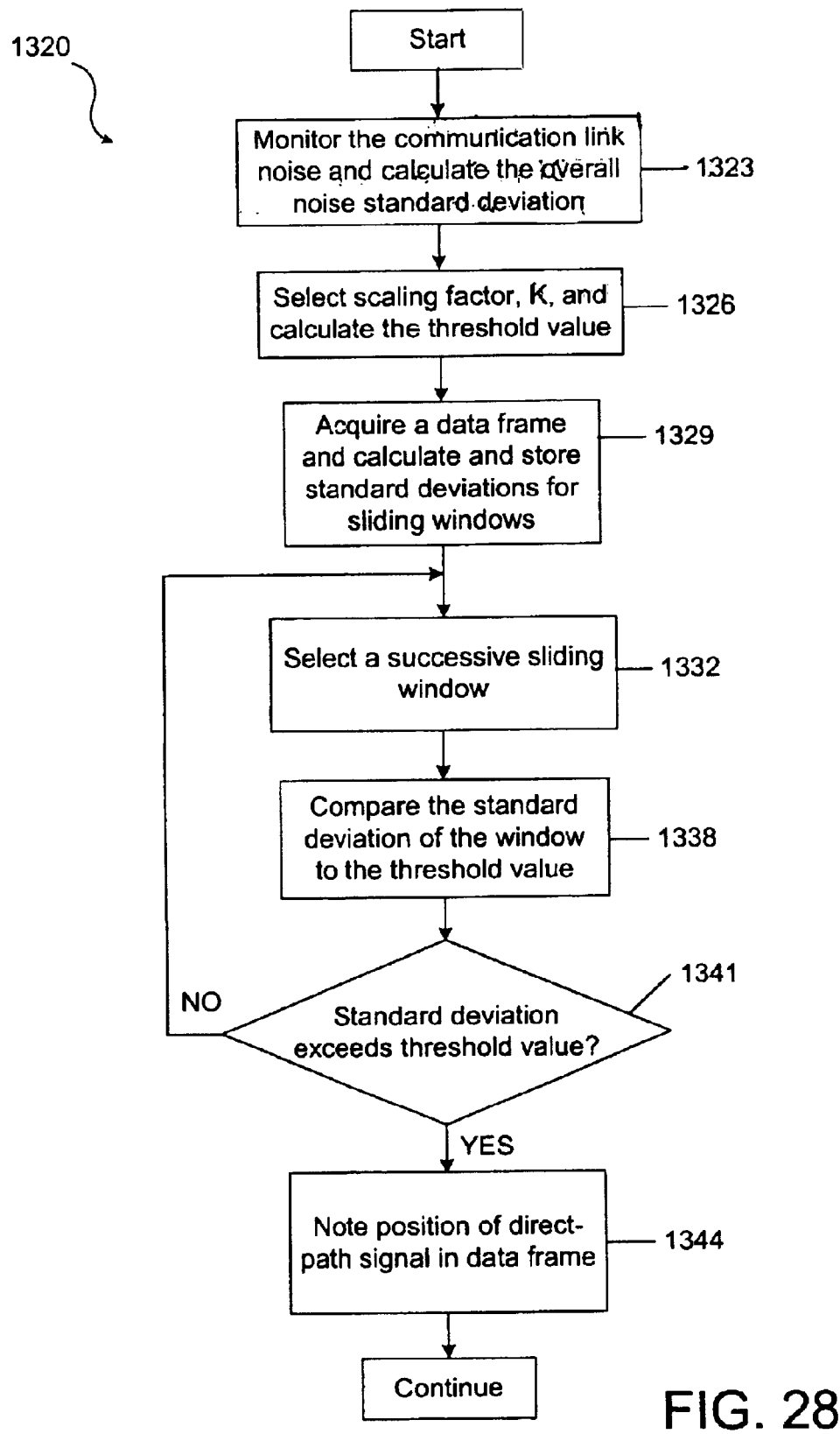
FIG. 28 illustrates a flow diagram that shows more detailed steps that a DPS detector circuitry according to the invention performs.

FIG. 28 illustrates a more detailed flow diagram 1320 of the operations that an exemplary embodiment of a DPS detector circuitry according to the invention performs. In step 1323, the DPS detector circuitry or a receiver circuitry monitors the communication link or channel noise and calculates an overall noise standard deviation. The overall noise standard deviation results from taking one or more snapshots of the noise in the link, calculating a standard deviation for the signal values within each snapshot, and averaging the standard deviations corresponding to the snapshots.

Next, in step 1326, the DPS detector circuitry selects a scaling factor, K. In this step, the DPS detector circuitry may calculate or accept as an input the scaling factor, K. The DPS detector circuitry calculates the threshold value, $P=K \cdot \sigma_{noise}$, where $\sigma_{noise}$ denotes the overall noise standard deviation. In step 1329, the receiver circuitry locks onto the transmitter's signal and acquires a data signal. The DPS detector circuitry receives a data frame corresponding to the data signal. The DPS detector circuitry selects sliding windows within the data frame, as described above, and calculates and stores a standard deviation value for the values within each window. In step 1332, the DPS detector circuitry selects a successive sliding window. In other words, in the first iteration, the DPS detector circuitry selects the first sliding window. In the following iterations, the DPS detector circuitry selects successive sliding windows, i.e., the second window, the third window, and so forth.

In step 1338, the DPS detector circuitry compares the standard deviation corresponding to the window selected in step 1332 to the threshold value, P. The DPS detector circuitry makes a decision based on the results of the comparison, as step 1341 shows. If the standard deviation for the selected sliding window exceeds the threshold value, the DPS detector circuitry proceeds to step 1344 and signals that it has located the direct-path signal. Otherwise, the DPS detector circuitry returns to step 1332 to select a following, or successive, sliding window. Note that, although FIG. 28 does not explicitly show it, the DPS detector circuitry may repeat steps 1329 through 1344 for additional received signals, as desired.

Note that the flow diagrams in FIGS. 27 and 28 show conceptually the operation of DPS detector circuitries according to the invention. As such, they assume the existence of a direct-path signal within the received data signal. One may enhance the operation depicted in the flow diagrams to provide for unusual, abnormal, error, or other conditions, as persons of ordinary skill in the art would understand. In exemplary embodiments according to the invention, one may include additional steps in the flow diagrams to account for the situation that the received data signal and data frame do not include a direct-path signal (e.g., an error condition or the like). For example, one may include steps in the flow diagrams to test whether the processing has reached the end of the data frame. If so, the DPS detector circuitry may provide an appropriate response, such as an error signal or another signal to alert other circuitry or the user.

Figure 29:
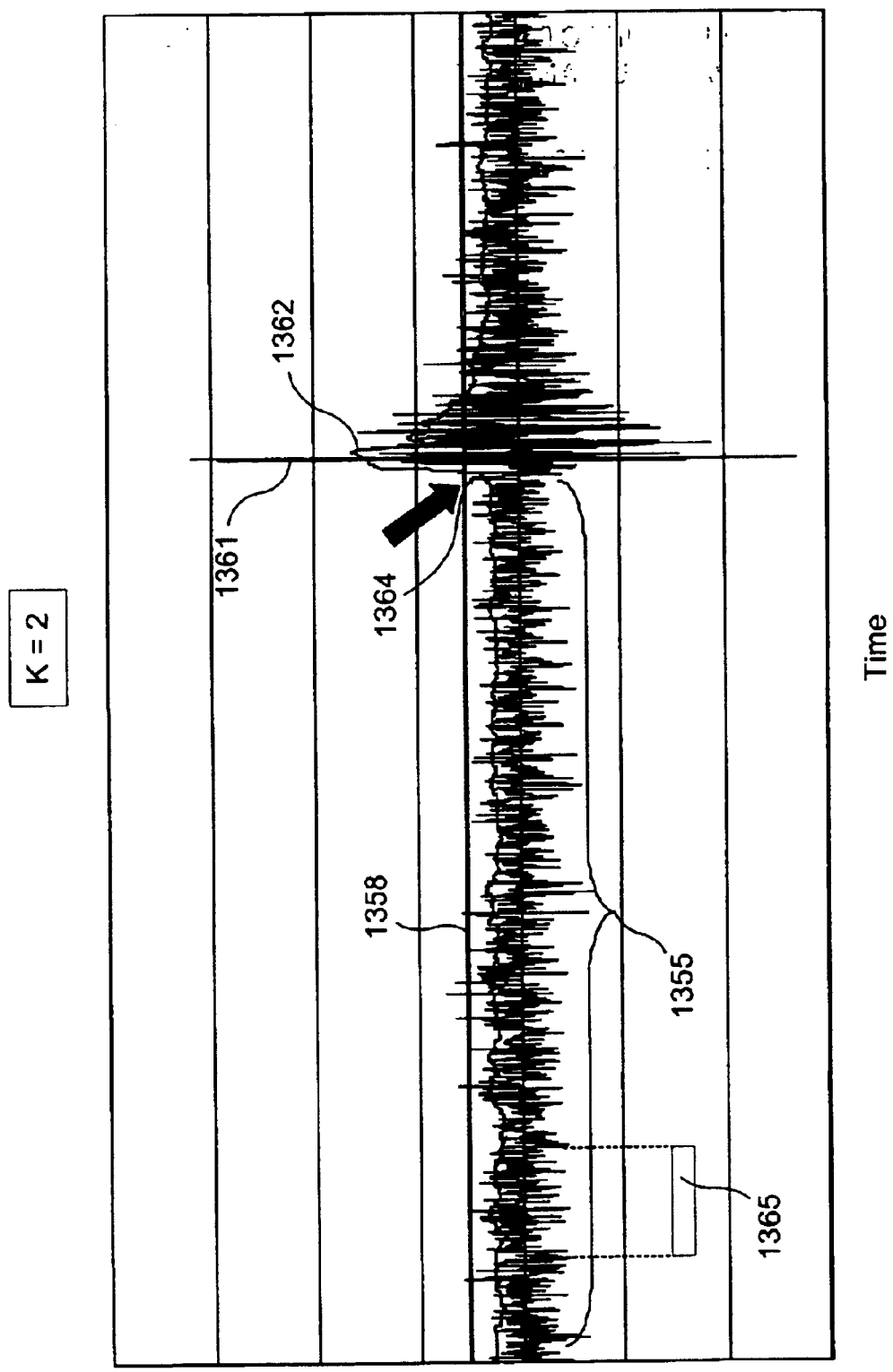
FIG. 29 shows a set of exemplary waveforms associated with a DPS detector circuitry according to the invention that uses a scaling factor, K, of 2.

FIG. 29 shows a plot of a typical waveform 1361 of a received signal. The waveform 1361 resulted from the transmission of an ultra-wideband pulse in a multipath environment that included a plurality of objects or obstructions. The figure includes a direct-path signal 1364 and a threshold signal 1358. The threshold signal corresponds to a value of the scaling factor, K, of 2. FIG. 29 also includes a waveform 1362 of the standard deviation values calculated for sliding windows within the data frame, as described above. A portion 1355 of the waveform 1361 represents a noise floor of the waveform 1361. The noise floor precedes the direct-path signal 1364. The pulses following the direct-path signal resulted from the interaction of the transmitted ultra-wideband pulse with the multipath environment. Note that the peak amplitudes of some of those pulses exceed the peak amplitude of the direct-path signal 1364. Note also an exemplary sliding window 1365 shown on the plot.

Figure 30:
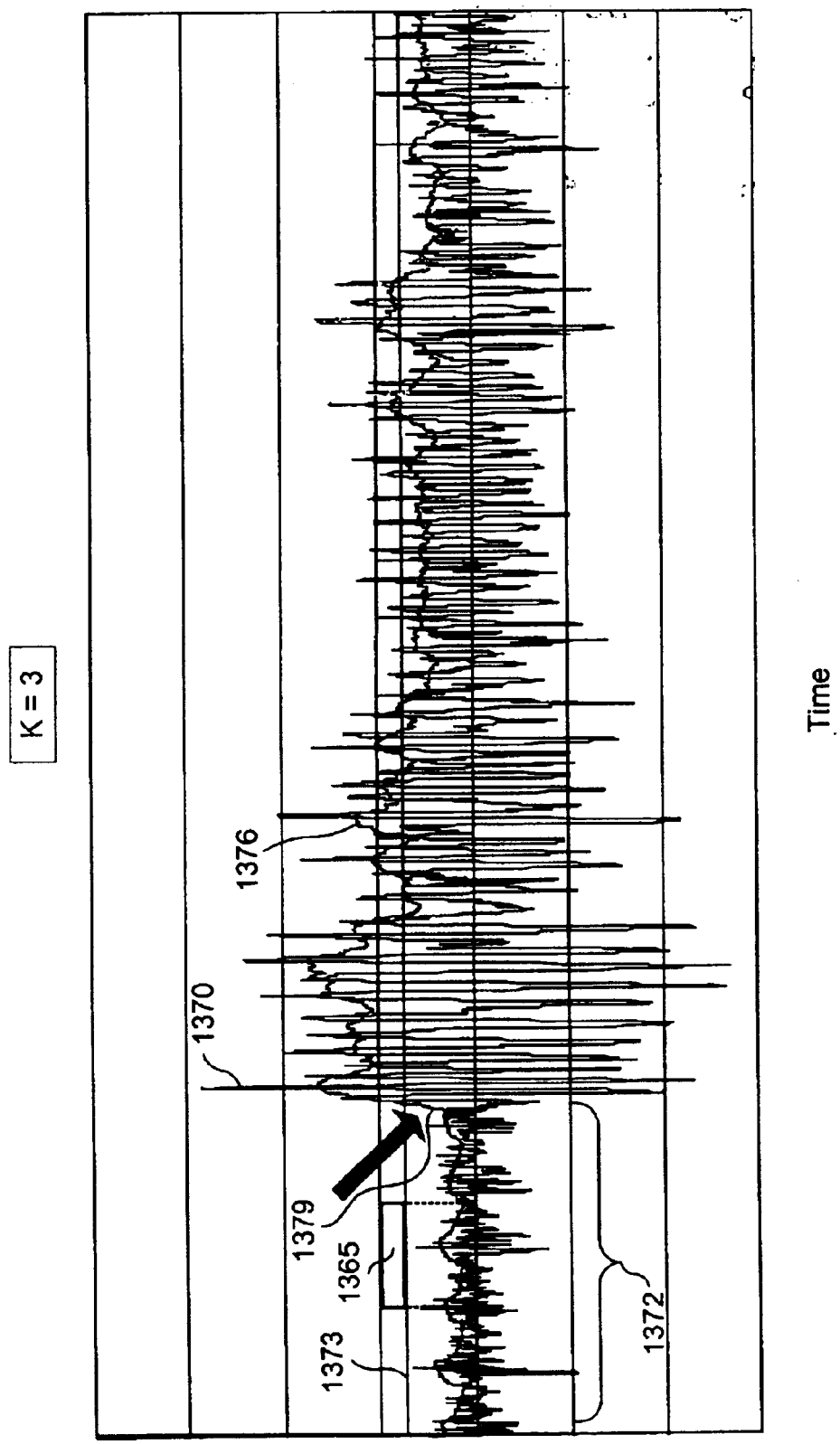
FIG. 30 depicts a set of exemplary waveforms associated with a DPS detector circuitry according to the invention that uses a scaling factor, K, of 3.

FIG. 30 shows another plot of a typical waveform 1370 of a received signal. The waveform 1370 also resulted from the transmission of an ultra-wideband pulse in a multipath environment that included a plurality of objects or obstructions. The figure includes a direct-path signal 1379 and a threshold signal 1373 (plotted in a dotted line-pattern). The threshold signal corresponds to a value of the scaling factor, K, of 3. FIG. 30 also includes a waveform 1376 of the standard deviation values calculated for sliding windows within the data frame, as described above. A portion 1372 of the waveform 1370 represents a noise floor of the waveform 1370. The noise floor precedes the direct-path signal 1379. The pulses following the direct-path signal resulted from the interaction of the transmitted ultra-wideband pulse with the multipath environment. Note that the peak amplitudes of some of those pulses exceed the peak amplitude of the direct-path signal 1379. Note also the exemplary sliding window 1364 shown on the plot.

Figure 31:
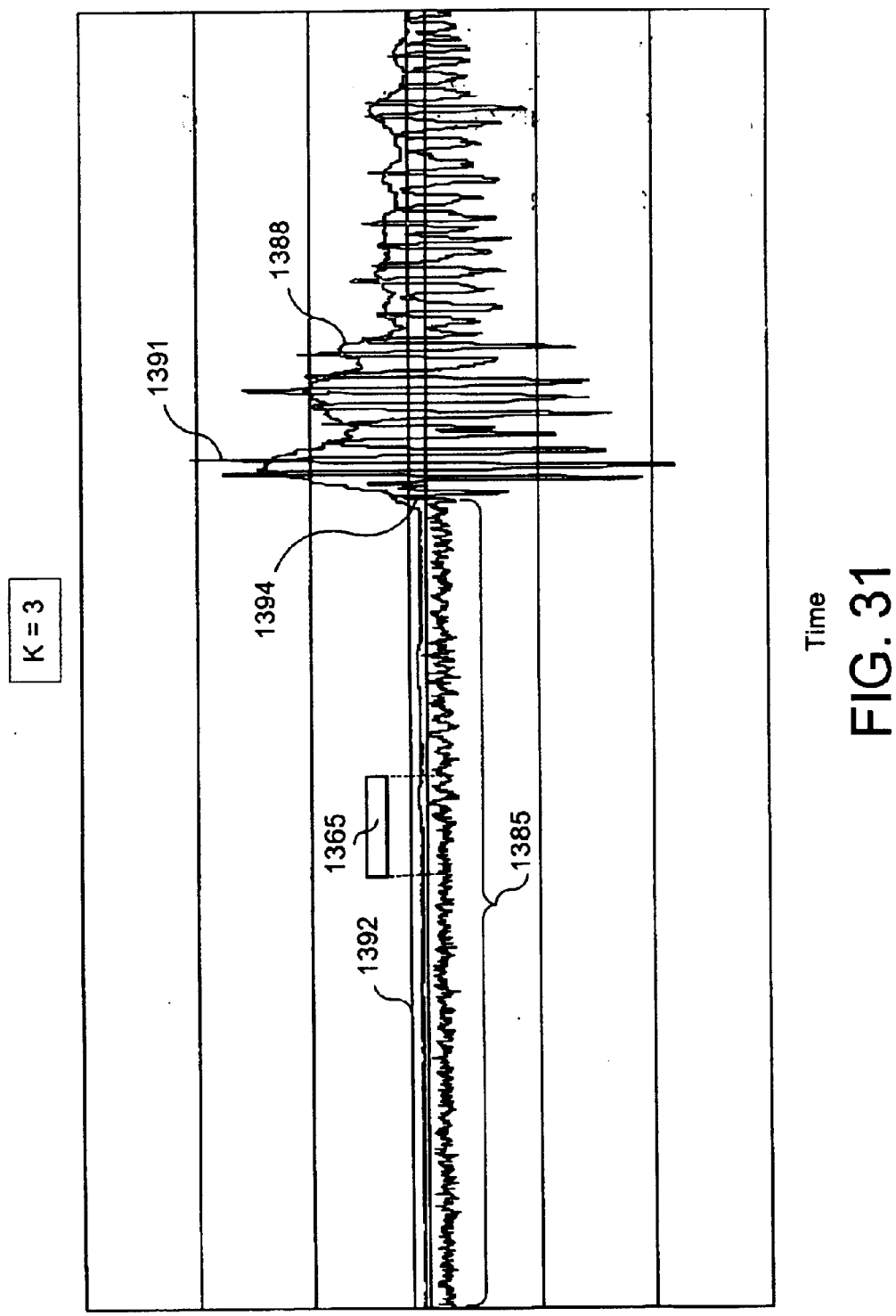
FIG. 31 illustrates another set of exemplary waveforms associated with a DPS detector circuitry according to the invention that uses a scaling factor, K, of 3.

FIG. 31 shows another plot of a typical waveform 1391 of a received signal. The waveform 1391 also resulted from the transmission of an ultra-wideband pulse in a multipath environment that included a plurality of objects or obstructions. The figure includes a direct-path signal 1394 and a threshold signal 1392. The threshold signal corresponds to a value of the scaling factor, K, of 3. FIG. 31 also includes a waveform 1388 of the standard deviation values calculated for sliding windows within the data frame, as described above. A portion 1385 of the waveform 1391 represents a noise floor of the waveform 1391. The noise floor precedes the direct-path signal 1394. The pulses following the direct-path signal resulted from the interaction of the transmitted ultra-wideband pulse with the multipath environment. Note that the peak amplitudes of some of those pulses exceed the peak amplitude of the direct-path signal 1394. Note also the exemplary sliding window 1365 shown on the plot.

Figure 32:
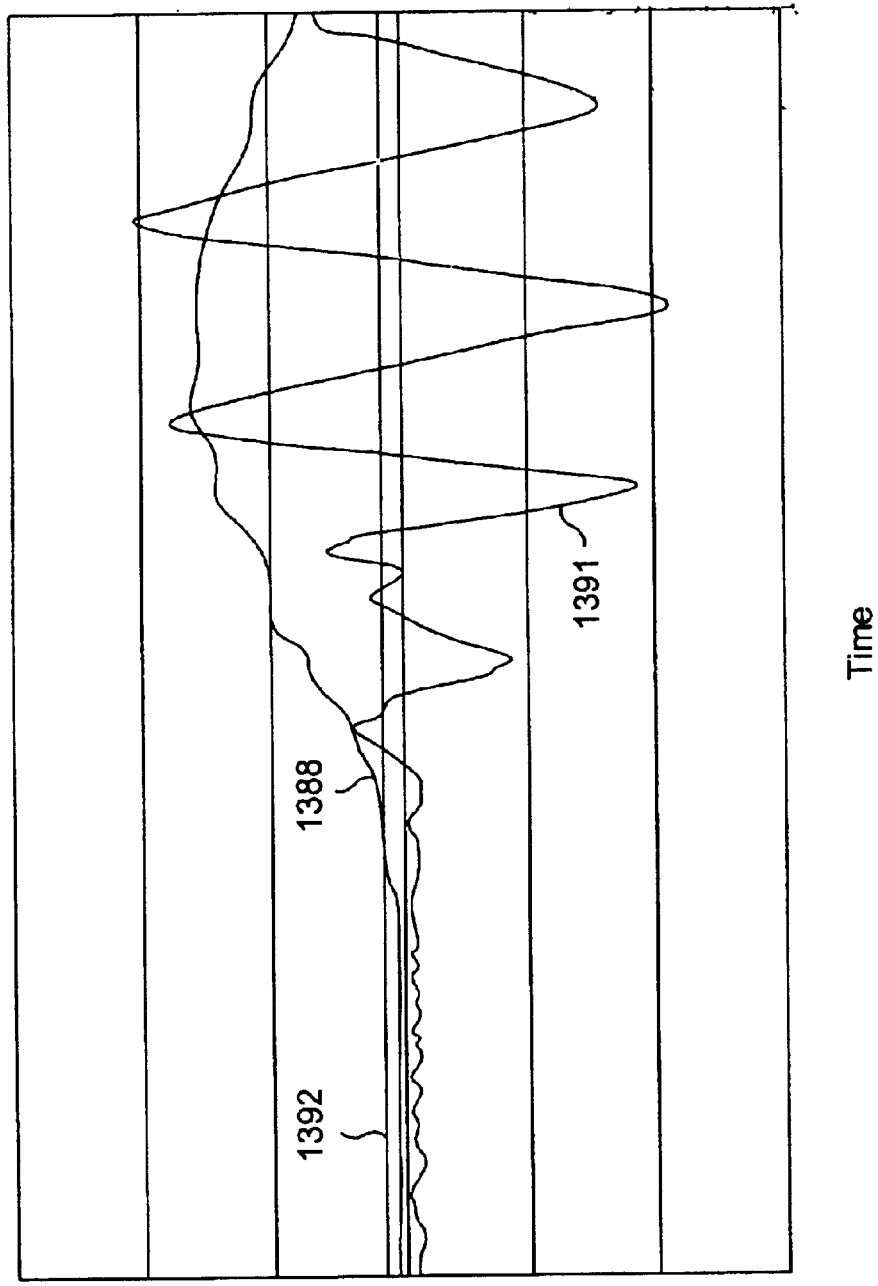
FIG. 32 illustrates an enlarged portion of the waveform shown in FIG. 31. The enlarged portion of the waveform shows the direct-path signal.

FIG. 32 shows an expanded view of a portion of the waveform 1391 of FIG. 31. FIG. 32 provides more details of the waveforms 1391 (the received signal), 1392 (the threshold signal), and 1388 (the standard deviation values calculated for sliding windows within the data frame). As with FIG. 31, FIG. 32 corresponds to a scaling factor, K, of 3.

The value of the threshold signal depends in part on the value one chooses for the scaling factor, K. Too small a value of K may result in an inaccurate identification of the direct-path signal. In other words, the DPS detector circuitry may incorrectly identify a fluctuation in the noise floor as the direct-path signal. On the other hand, selecting too large a value of K may result in the DPS detector circuitry to miss the true direct-path signal and, instead, pick another, later-arriving pulse, as the direct-path signal. Thus, selecting a proper value of K helps to ensure accurate detection of the direct-path signal.

As one option, one may select a proper value of the scaling factor, K, by characterizing the communication, ranging, or positioning system. Using this method, one may set up a transmitter and a receiver at a known distance. Next, one may select an initial value of K, say, K=1, and transmit and receive a plurality of pulses. One may then repeat the process, but with varying values of K, e.g., 2 or 3, and collect data regarding the performance of the DPS detector circuitry for each value of K. Knowing the distance, one knows when the direct-path signal should arrive, so one may characterize the performance of the system as a function of K.

After characterizing the system performance, one may select a suitable value of K based on the desired system performance specifications. In other words, by examining the results, one may select a value of K that causes the DPS detector circuitry to obtain a desired level of performance. Thus, one may select the value of K empirically for a given communication system and a given propagation environment. One may also employ statistical techniques to select a value of K. For example, one may assume that the noise has a Gaussian distribution, and select a value of K that results in successful detection of the direct-path signal a desired percentage of time, say, 99.99% of the time.

Figure 33:
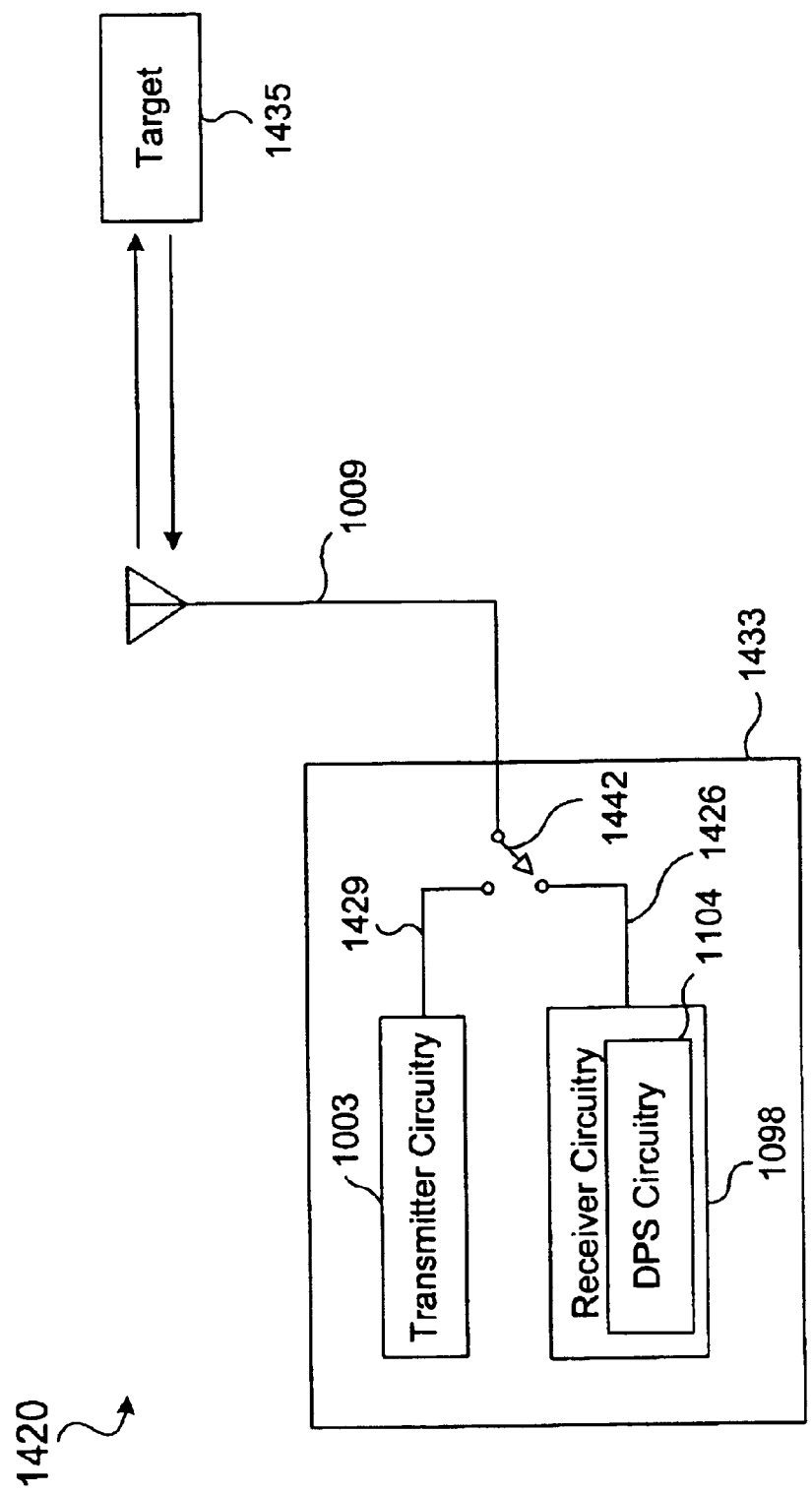
FIG. 33 illustrates a radar system that includes a direct-path-signal detector circuitry according to the invention.
Figure 34:
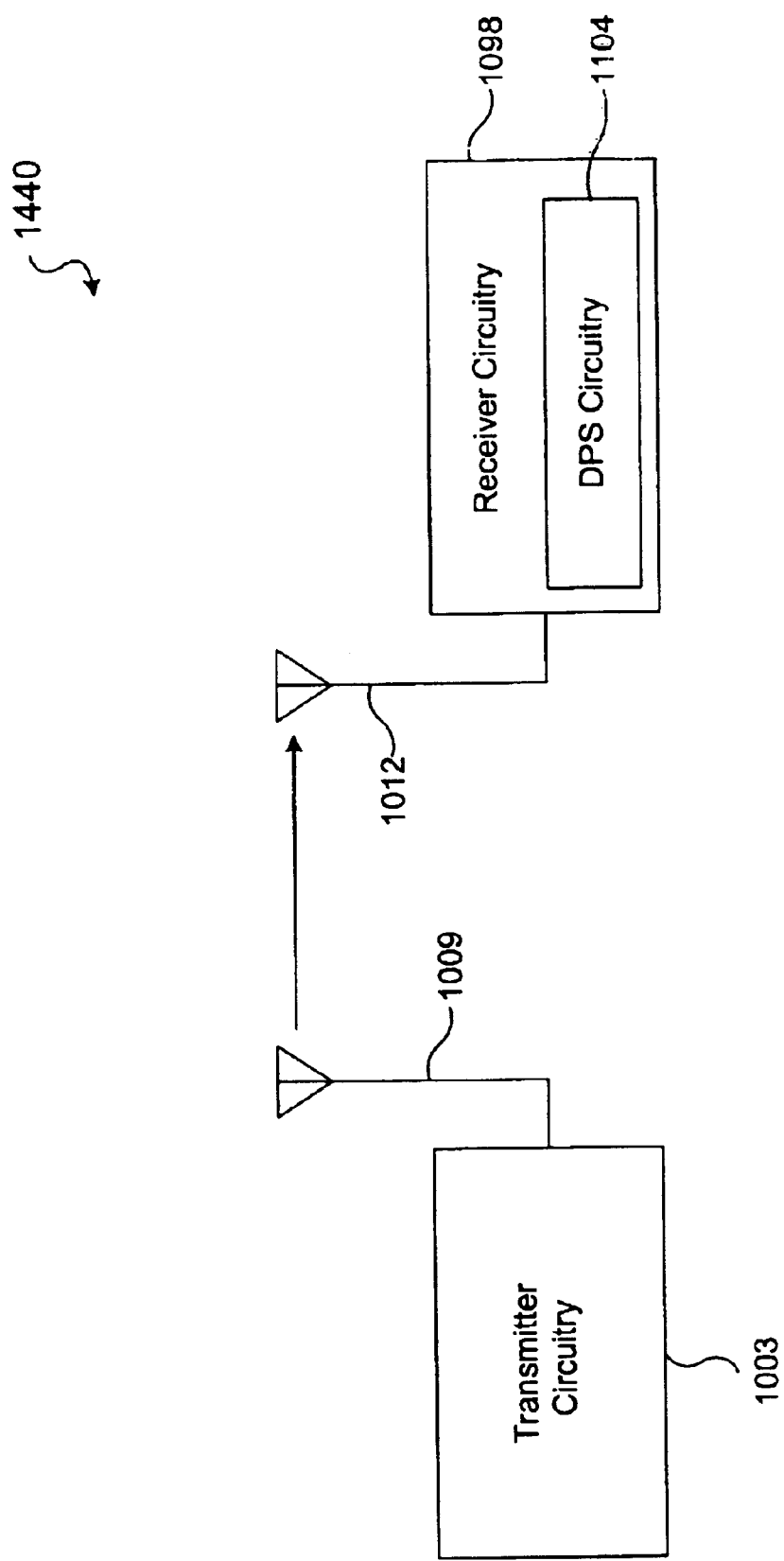
FIG. 34 shows a communication system that comprises a transmitter circuitry and a receiver circuitry, wherein the receiver circuitry includes a DPS detector circuitry according to the invention.
Figure 35:
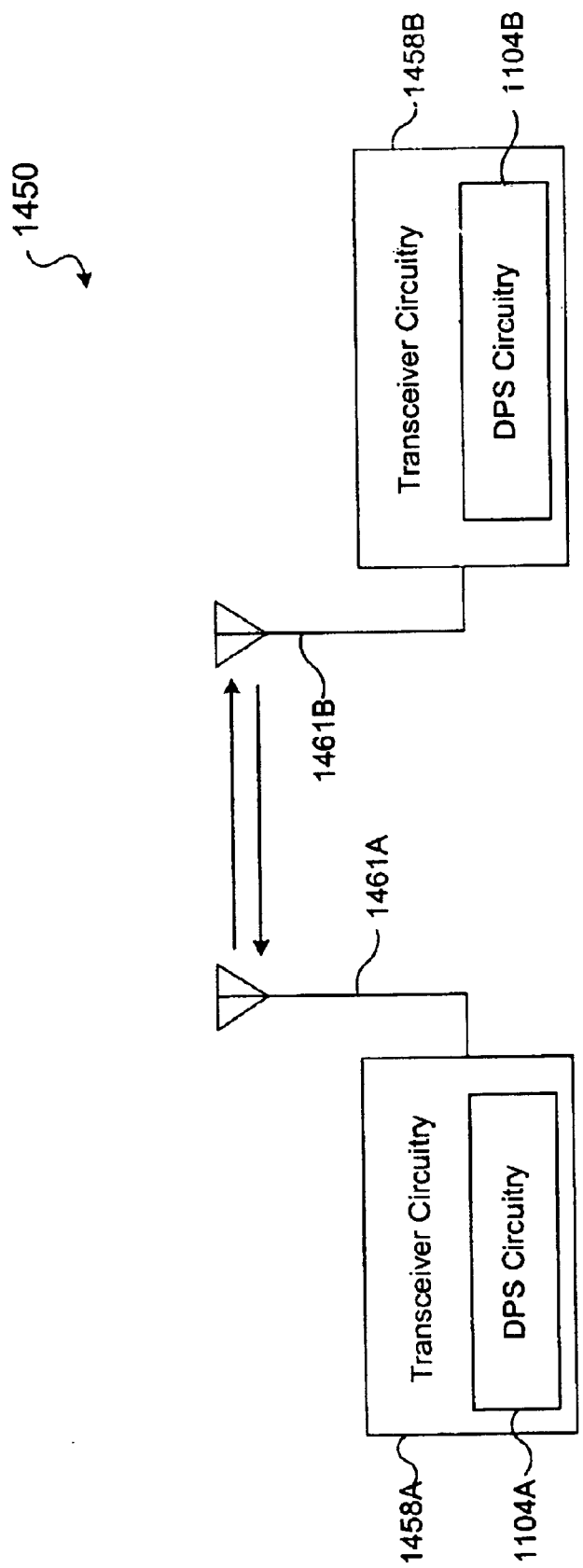
FIG. 35 depicts a communication system that comprises a pair of transceiver circuitries, wherein each transceiver circuitry includes a DPS detector circuitry according to the invention.

One may use DPS detector circuitries according to the invention in a wide variety of communication, radar, positioning, and ranging systems. By way of illustration, FIGS. 33–35 provide some examples of such systems. Other examples of the applications of DPS detector circuitry according to the invention appear in FIGS. 16 and 18–21. FIG. 33 shows a system 1420 that includes a radar circuitry 1433. The radar circuitry 1433 includes a transmitter circuitry 1003, a receiver circuitry 1098, a DPS detector circuitry 1104, and a mode switch 1442. The mode switch 1442 allows the radar system to operate in the transmit mode or in the receiver mode, as desired. The radar system 1433 transmits and receives signals via an antenna 1009.

In operation, the radar circuitry 1433 transmits an RF pulse via the antenna 1009. In exemplary embodiments, the RF pulse comprises an ultra-wideband pulse, i.e., a Gaussian monocycle. After transmitting the RF pulse, the radar circuitry 1433 switches to its receiving mode. The transmitted pulse arrives at a target 1435. The target 1435 reflects the transmitted signal. The radar system 1433 receives the reflected signal via the antenna 1009. Using the DPS detector circuitry 1104 according to the invention, the radar circuitry 1433 detects the position of the direct-path signal. The direct-path signal typically corresponds to the reflected signal and, thus, the distance between the radar circuitry 1433 and the target 1445.

Note that, although FIG. 33 shows the DPS detector circuitry 1104 as residing within the receiver circuitry 1098, one may place the DPS detector circuitry 1104 in other locations within the system 1420. For example, if the receiver and transmitter circuitry share some of their circuitry, one may place the DPS detector circuitry within the shared circuitry. As another example, one may place the DPS detector circuitry within the radar circuitry 1433, but not within the receiver circuitry 1098. In that case, the DPS detector circuitry 1104 would couple to the transmitter circuitry 1003, the receiver circuitry 1098, or other circuitry within the radar circuitry 1433, as persons skilled in the art would understand.

FIG. 34 illustrates a communication system 1440 that comprises a transmitter circuitry 1003, a receiver circuitry 1098, and a DPS detector circuitry 1104 according to the invention. The transmitter circuitry 1003 transmits signals to the receiver circuitry 1098 via a transmitter antenna 1009. The receiver circuitry 1098 receives the transmitted signals via a receiver antenna 1012. The receiver circuitry 1098 processes the received signals, as desired, for example, by demodulating, filtering, and the like. The DPS detector circuitry 1104 detects the direct-path signal, i.e., the first pulse that arrives at the receiver circuitry 1098.

Note that, although in the system of FIG. 34 the DPS detector circuitry 1104 resides within the receiver circuitry 1098, one may use other circuit arrangements, as desired. For example, one may place the DPS detector circuitry 1104 outside the receiver circuitry 1098, and couple the DPS detector circuitry 1104 to the receiver circuitry 1098. FIG. 16 shows such an arrangement. Referring to FIG. 34, note also that the DPS detector circuitry 1104, the receiver circuitry 1098, or both, may couple to a processor circuitry (not shown in FIG. 34), as desired. The processor circuitry may provide further processing functions, for example, baseband processing, signal processing, and the like. The processor circuitry may comprise a DSP or other type of processor, as desired.

FIG. 35 illustrates a communication system 1450 that comprises a first transceiver circuitry 1458A and a second transceiver circuitry 1458B. The transceiver circuitry 1458A comprises a first DPS detector circuitry 1104A according to the invention. Similarly, the transceiver circuitry 1458B includes a second DPS detector circuitry 1104B according to the invention. The transceiver circuitry 1458A transmits signals to, and receives signals from, transceiver circuitry 1458B via a first antenna 1461A. Similarly, The transceiver circuitry 1458B transmits signals to, and receives signals from, transceiver circuitry 1458A via a second antenna 1461B. Each of the first transceiver circuitry 1458A and the second transceiver circuitry 1458B processes the received signals, as desired, for example, by demodulating, filtering, and the like. The DPS detector circuitry 1104A and the DPS detector circuitry 1104B detect the direct-path signal at the first transceiver circuitry 1458A and the second transceiver circuitry 1458B, respectively (i.e., the first pulses that arrive at the first transceiver circuitry 1458A and at the second transceiver circuitry 1458B, respectively).

Note that the first transceiver circuitry 1458A, the second transceiver circuitry 1458B, or both, may include may include a processor circuitry (not shown in FIG. 35), as desired. The processor circuitry may provide further processing functions, for example, baseband processing, signal processing, and the like. The processor circuitry may comprise a DSP, or other type of processor circuitry, as desired. Also note that, rather than using a first transceiver circuitry 1458A and a second transceiver circuitry 1458B in a communication system, one may employ a system that comprises a transmitter circuitry and one or more transceiver circuitries. Each of the transceiver circuitries may include a DPS detector circuitry according to the invention, as desired.

Transceiver circuitries that include DPS circuitry according to the invention prove useful in certain mobile telephony applications. In particular, using DPS circuitries according to the invention enables more precise positioning and ranging in position-based commerce. In position-based commerce, the vendor seeks to ascertain the location, range, or both, of customer mobile units with accuracy. Ranging apparatus that incorporate the invention provide that capability, especially in indoor applications, where traditional positioning and ranging equipment perform poorly or fail to perform at all. More generally, apparatus that includes the invention proves useful in situations where one desires to locate the user of a mobile telecommunication apparatus (for example, in an emergency situation).

Note that the DPS detector circuitries according to the invention lend themselves to various design and implementation choices, as a person skilled in the art would understand. In exemplary embodiments, the transmitted pulse comprises an ultra-wideband pulse, i.e., a Gaussian monocycle. DPS detector circuitry according to the invention, however, may operate effectively with other types of pulses, as persons skilled in the art would understand. Moreover, for the sake of facilitating the presentation of the invention, the above description of DPS detector circuitries according to the invention refers to the transmission of a pulse from a transmitter. Persons skilled in the art would understand that one may effectively use DPS detector circuitry according to the invention if the transmitter transmits a plurality of pulses.

Furthermore, the processor circuitries referenced in the description of the invention may comprise a data processor circuitry of any suitable type and configuration. By way of illustration, the processor circuitry may comprise a digital signal-processor (DSP), a complex instruction-set machine (CISC), a reduced instruction-set machine (RISC), and the like. More generally, one may implement the DPS detector circuitry according to the invention, the processor circuitry, or both, using a variety of circuit types and configurations. For example, one may realize a DPS detector circuitry, a processor circuitry, or both, using a state machine, gate arrays, programmable logic-devices, and the like, as persons skilled in the art would understand. Moreover, one may implement a DPS detector circuitry using software, hardware, or a combination of hardware and software, as desired, consistent with the embodiments of the invention described here.

Further modifications and alternative embodiments of this invention will be apparent to persons skilled in the art in view of this description of the invention. Accordingly, this description teaches those skilled in the art the manner of carrying out the invention and are to be construed as illustrative only. The forms of the invention shown and described should be taken as exemplary embodiments.

Persons skilled in the art may make various changes in the shape, size and arrangement of parts without departing from the scope of the invention described in this document. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

I claim:

1. A direct-path-signal detector circuitry, comprising:
  a standard deviation calculator circuitry configured to determine a standard deviation of a plurality of data values within a data frame that corresponds to a radio-frequency signal received via a communication link; and
  a threshold circuitry configured to detect a direct-path signal depending on the relative values of the standard deviation and a threshold signal.

2. The circuitry of claim 1, in which the received radio-frequency signal is received via a multipath propagation medium.

3. The circuitry of claim 2, in which the threshold circuitry further comprises a comparator circuitry configured to compare the determined standard deviation with the threshold signal to detect the direct-path signal.

4. The circuitry of claim 3, in which the plurality of data values reside in a window within the data frame.

5. The circuitry of claim 4, in which the received signal comprises an ultra-wideband signal.

6. The circuitry of claim 5, in which the threshold signal comprises an overall standard deviation of a noise floor of the communication link, multiplied by a scaling factor.

7. The circuitry of claim 6, in which the window constitutes a sliding window.

8. A radio-frequency (RF) apparatus, comprising:
  a radio-frequency receiver circuitry configured to receive via a communication link a plurality of pulses that result from a transmission of a radio-frequency pulse in a multipath propagation medium; and
  a detector circuitry coupled to the radio-frequency receiver circuitry, the detector circuitry configured to detect a direct-path pulse in the plurality of pulses,
    wherein the detector circuitry detects the direct-path signal within a data frame that corresponds to the plurality of pulses, wherein the detector circuitry is further configured to detect the direct-path signal by using a standard deviation of a plurality of data values in a window within the data frame, and the detector circuitry is further configured to detect the direct-path signal depending on the relative values of the standard deviation and a threshold signal.

9. The apparatus of claim 8, in which the radio-frequency pulse transmitted in the multipath propagation medium comprises an ultra-wideband signal.

10. The apparatus of claim 9, in which the threshold signal comprises an overall standard deviation of a noise floor of the communication link, multiplied by a scaling factor.

11. The apparatus of claim 10, in which the window comprises one of a plurality of sliding windows within the data frame.

12. The apparatus of claim 11, in which the detector circuitry is further configured to successively compare a standard deviation of data values within each of the plurality of sliding windows with the threshold signal.

13. The apparatus of claim 12, wherein the overall noise standard deviation comprises an average of a plurality of successively obtained standard deviations of a noise floor of the communication link.

14. A communication system, comprising:
  a transmitter circuitry configured to transmit a radio-frequency pulse into a multipath propagation medium;
  a receiver circuitry configured to receive a plurality of pulses that result from the transmission of the radio-frequency pulse into the multipath propagation medium; and
  a detector circuitry configured to detect a direct-path pulse in the received plurality of pulses,
    wherein the detector circuitry detects the direct-path signal within a data frame that corresponds to the plurality of pulses, wherein the detector circuitry is further configured to detect the direct-path signal by using a standard deviation of a plurality of data values in a window within the data frame, and wherein the detector circuitry is further configured to detect the direct-path signal depending on the relative values of the standard deviation and a threshold signal.

15. The system of claim 14, in which the receiver circuitry receives the plurality of pulses via a communication link.

16. The system of claim 14, in which the radio-frequency pulse transmitted in the multipath propagation medium comprises an ultra-wideband signal.

17. The system of claim 16, in which the threshold signal comprises an overall standard deviation of a noise floor of the communication link, multiplied by a scaling factor.

18. The system of claim 17, in which the window comprises one of a plurality of sliding windows within the data frame.

19. The system of claim 18, in which the detector circuitry is further configured to successively compare a standard deviation of data values within each of the plurality of sliding windows with the threshold signal.

20. The system of claim 19, wherein the overall noise standard deviation comprises an average of a plurality of successively obtained standard deviations of a noise floor of the communication link.

21. The system of claim 20, in which the receiver circuitry comprises a scanning receiver circuitry.

22. The system of claim 21, in which the receiver circuitry and the detector circuitry reside within a first transceiver circuitry.

23. The system of claim 22, in which the transmitter circuitry resides within a second transceiver circuitry.

24. The system of claim 23, in which the detector circuitry resides within a processor circuitry coupled to the receiver circuitry.

25. The system of claim 21, in which the transmitter circuitry, the receiver circuitry, and the detector circuitry reside within a radar circuitry.

26. The system of claim 25, in which the detector circuitry resides within a processor circuitry coupled to the receiver circuitry.

27. The system of claim 25, in which the detector circuitry resides within the receiver circuitry.

28. A method of detecting a direct-path-signal, comprising:
   determining a standard deviation of a plurality of data values within a data frame that corresponds to a radio-frequency signal received via a communication link; and
   detecting a direct-path signal depending on the relative values of the standard deviation and a threshold signal.

29. The method of claim 28, in which the received radio-frequency signal is received via a multipath propagation medium.

30. The method of claim 29 which further includes comparing the determined standard deviation with the threshold signal to detect the direct-path signal.

31. The method of claim 30, in which the plurality of data values reside in a window within the data frame.

32. The method of claim 31, in which the received signal comprises an ultra-wideband signal.

33. The method of claim 32, further comprising:
   determining an overall standard deviation of a noise floor of the communication link; and
   multiplying the overall standard deviation of the noise floor by a scaling factor to obtain the threshold signal.

34. The method of claim 33, wherein the window comprises a sliding window.

35. A method of detecting a direct-path pulse in a radio-frequency (RF) apparatus, comprising:
   receiving via a communication link a plurality of pulses that result from a transmission of a radio-frequency pulse in a multipath propagation medium;
   detecting a direct-path pulse in the plurality of pulses by using a detector circuitry in the radio frequency apparatus; and
   detecting the direct-path pulse within a data frame that corresponds to the plurality of pulses depending on relative values of a standard deviation of a plurality of data values in a window within the data frame and a threshold signal.

36. The method of claim 35, wherein the radio-frequency pulse transmitted in the multipath propagation medium comprises an ultra-wideband signal.

37. The method of claim 36, further comprising:
   determining an overall standard deviation of a noise floor of the communication link; and
   multiplying the overall standard deviation of the noise floor by a scaling factor to obtain the threshold signal.

38. The method of claim 37, wherein the window comprises one of a plurality of sliding windows within the data frame.

39. The method of claim 38, which further includes comparing successively a standard deviation of data values within each of the plurality of sliding windows with the threshold signal to detect the direct-path signal.

40. The method of claim 39, which further includes averaging a plurality of successively obtained standard deviations of a noise floor of the communication link to obtain the overall noise standard deviation.

* * * * *